(12) United States Patent
Khoshkava et al.

(10) Patent No.: US 9,898,903 B2
(45) Date of Patent: Feb. 20, 2018

(54) SYSTEMS AND METHODS FOR HAPTIC SURFACE ELEMENTS

(71) Applicant: Immersion Corporation, San Jose, CA (US)

(72) Inventors: Vahid Khoshkava, Montreal (CA); Vincent Levesque, Montreal (CA); Jamal Saboune, Montreal (CA); Abdelwahab Hamam, Montreal (CA); Juan Manuel Cruz-Hernandez, Montreal (CA); Liwen Wu, Verdun (CA)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 15/062,903

(22) Filed: Mar. 7, 2016

(65) Prior Publication Data

US 2017/0256144 A1    Sep. 7, 2017

(51) Int. Cl.
   *H04B 3/36*     (2006.01)
   *G08B 6/00*     (2006.01)
   *H04W 4/00*     (2018.01)
   *H04M 1/725*     (2006.01)

(52) U.S. Cl.
   CPC .......... *G08B 6/00* (2013.01); *H04M 1/72527* (2013.01); *H04W 4/008* (2013.01)

(58) Field of Classification Search
   CPC ..... G08B 6/00; H04M 1/72527; H04W 4/008
   USPC .......... 340/407.1, 407.2; 345/156, 173, 174, 345/647
   See application file for complete search history.

(56) References Cited

U.S. PATENT DOCUMENTS

| | | |
|---|---|---|
| 7,916,002 B2 | 3/2011 | Uusitalo et al. |
| 8,154,527 B2 | 4/2012 | Ciesla et al. |
| 8,531,485 B2 | 9/2013 | Birnbaum et al. |

(Continued)

FOREIGN PATENT DOCUMENTS

| | | |
|---|---|---|
| EP | 2605111 A2 | 6/2013 |
| WO | WO 2009/088985 | 7/2009 |

OTHER PUBLICATIONS

U.S. Appl. No. 14/974,456, filed Dec. 18, 2015, Khoshkava et al.

(Continued)

*Primary Examiner* — Ojiako Nwugo
(74) *Attorney, Agent, or Firm* — Kilpatrick Townsend & Stockton LLP

(57) ABSTRACT

One illustrative system disclosed herein includes an enclosure configured to define a boundary of a chamber, the chamber including a material, and a flexible layer coupled overtop of the chamber and configured to enclose the chamber. The illustrative system also includes a first actuation device configured to receive a first haptic signal and responsively output a first haptic effect by changing a characteristic of the material to deform the flexible layer. The illustrative system also includes a second actuation device configured to receive a second haptic signal and responsively output a second haptic effect by applying an electrical signal to the flexible layer. The illustrative system further includes a processor in communication with the first actuation device and the second actuation device. The processor is configured to transmit the first haptic signal to the first actuation device and the second haptic signal to the second actuation device.

20 Claims, 18 Drawing Sheets

(56) References Cited

U.S. PATENT DOCUMENTS

| | | | |
|---|---|---|---|
| 9,019,228 B2 | 4/2015 | Yairi et al. | |
| 9,063,627 B2 | 6/2015 | Yairi et al. | |
| 9,239,623 B2 | 1/2016 | Yairi et al. | |
| 9,274,612 B2 | 3/2016 | Ciesla et al. | |
| 9,448,713 B2 | 9/2016 | Cruz-Hernandez et al. | |
| 2004/0210933 A1* | 10/2004 | Dresti | G08C 17/00 725/40 |
| 2009/0128503 A1 | 5/2009 | Grant et al. | |
| 2009/0174687 A1* | 7/2009 | Ciesla | G06F 3/04886 345/174 |
| 2009/0250267 A1 | 10/2009 | Heubel et al. | |
| 2010/0152620 A1* | 6/2010 | Ramsay | A61B 5/0002 600/595 |
| 2010/0231550 A1 | 9/2010 | Cruz-Hernandez et al. | |
| 2010/0283727 A1 | 11/2010 | Jiang et al. | |
| 2011/0102462 A1* | 5/2011 | Birnbaum | G06F 3/04886 345/647 |
| 2012/0133494 A1 | 5/2012 | Cruz-Hernandez et al. | |
| 2012/0268412 A1 | 10/2012 | Cruz-Hernandez et al. | |
| 2013/0002411 A1* | 1/2013 | Henderson | H02N 2/005 340/407.1 |
| 2013/0002570 A1 | 1/2013 | Ogg | |
| 2013/0318437 A1* | 11/2013 | Jung | G06F 3/0488 715/251 |
| 2014/0132532 A1* | 5/2014 | Yairi | G06F 3/041 345/173 |
| 2014/0139450 A1 | 5/2014 | Levesque et al. | |
| 2014/0320431 A1 | 10/2014 | Cruz-Hernandez et al. | |
| 2014/0362014 A1 | 12/2014 | Ullrich et al. | |
| 2015/0061703 A1 | 3/2015 | Jiang et al. | |
| 2015/0177838 A1* | 6/2015 | Bae | G06F 3/016 345/173 |
| 2015/0293633 A1 | 10/2015 | Ray et al. | |
| 2016/0103488 A1* | 4/2016 | Levesque | G06F 3/016 345/156 |
| 2016/0334901 A1* | 11/2016 | Rihn | G06F 3/044 |
| 2017/0178470 A1 | 6/2017 | Khoshkava et al. | |

OTHER PUBLICATIONS

Agrawal, A. et al., Surface wrinkling in liquid crystal elastomers, Soft Matter, 2012, 8:7138-7142.

Greenemeier, L. et al., Impermanent press: new deformable surface to give smart phone touch screens raised tactile keyboards, Scientific American, web page at http://www.scientificamerican.com/article/tactile-touch-screen/, as available via the Internet, Jun. 2012.

Gu, W. et al., Multiplexed hydraulic valve actuation using ionic liquid filled soft channels and Braille displays, Applied Physics Letters, 2007, 90:033505.

Holmes, D. et al., Snapping surfaces, Adv. Mater., 2007, 19:3589-3593.

Ingraham, N. et al., Tactus technology unveils touchscreen prototype with appearing and disappearing keys (hands-on), The Verge, web page at http://www.theverge.com/2012/6/5/3064674/tactus-technology-prototype-touchscreen-appearing-disappearing-keys, as available via the Internet, 2012.

Kato, Y. et al., Sheet-type Braille displays by integrating organic field-effect transistors and polymeric actuators, IEEE Transactions on Electron Devices, 2007, 54(2):202-209.

Kwon, H. et al., Braille code display device with a pdms membrane and thermopneumatic actuator, IEEE 21st International Conference on Micro Electro Mechanical Systems, 2008, 527-530.

Lee, J. et al., A micromachined refreshable braille cell, Journal of Microelectromechanical Systems, 2005, 14(4): 673-682.

Nouveau , T., Mobile tactile tech gets physical, web page at http://www.tgdaily.com/mobility-features/63829-mobile-tactile-tech-gets-physical, as available via the Internet and printed Jun. 6, 2012.

Shea, H. et al., Artificial muscles with silicone-gold nanocomposite electrodes, SPIE Newsroom, Feb. 2011, 3 pages.

Strategic Polymer Sciences, Inc., Revolutionary electro mechanical polymer actuators, web page at http://www.strategicpolymers.com/technology/, as available via the Internet and printed Apr. 11, 2013.

Wang, Q. et al., Cephalopod-inspired design of electro-mechano-chemically responsive elastomers for on-demand fluorescent patterning, Nature Communications, 2014, 5(4899), 9 pages.

Wu, X. et al., A portable pneumatically-actuated refreshable braille cell, International Transducers Solid-State Sensors, Actuators and Microsystems Conference, 2007, 1409-1412.

Yobas, L. et al., A novel bulk-micromachined electrostatic microvalve with a curved-compliant structure applicable for a pneumatic tactile display, Journal of Microelectromechanical Systems, 2001, 10(2):187-196.

Yobas, L. et al., A novel integrable microvalve for refreshable braille display system, Journal of Microelectromechanical Systems, 2003, 12(3):252-263.

Yobas, L. et al., Electrostatically actuated mems microvalve suitable for pneumatically refreshed braille-display-system, Case Western Reserve Universirty, Ohio, ASME Summer Bioengineering Conference, Jun. 16-20 1999.

Zhang, W. et al., Completely integrated, thermo-pneumatically tunable microlens, Optics Express, 2011, 19(3): 2347-2362.

European Patent Office Application No. 17158500.3, Extended European Search Report dated Jul. 18, 2017.

* cited by examiner

SYSTEMS AND METHODS FOR HAPTIC SURFACE ELEMENTS

FIELD OF THE INVENTION

The present invention relates to the field of user interface devices. More specifically, the present invention relates to haptic surface elements.

BACKGROUND

The quality of the interfaces through which humans interact with computer-based systems is becoming increasingly important. To create more intuitive and enhanced user experiences, such systems may use visual, audio, and/or haptic feedback to reproduce aspects of interactions in the physical world. Haptic feedback is often generated by rotating an offset (asymmetric) mass around a shaft. There is a need for additional types of haptic feedback and techniques for providing haptic feedback.

SUMMARY

Embodiments of the present disclosure comprise haptic surface elements. In one embodiment, a system of the present disclosure may comprise an enclosure configured to define a boundary of a chamber. The chamber may comprise a material. The system may also comprise a flexible layer coupled overtop of the chamber and configured to enclose the chamber. The system may also comprise a first actuation device configured to receive a first haptic signal and, in response to the first haptic signal, output a first haptic effect by changing a characteristic of the material to deform the flexible layer. The system may additionally comprise a second actuation device configured to receive a second haptic signal and, in response to the second haptic signal, output a second haptic effect by applying an electrical signal to the flexible layer. The system may also comprise a processor in communication with the first actuation device and the second actuation device. The processor may be configured to transmit the first haptic signal to the first actuation device. The processor may additionally or alternatively be configured to transmit the second haptic signal to the second actuation device.

In another embodiment, a method of the present disclosure may comprise determining a first haptic effect based on a first event, the first haptic effect comprising a deformation of a flexible surface enclosing a chamber. The method may comprise transmitting a first haptic signal to a first actuation device, the first actuation device configured to output the first haptic effect. The method may comprise outputting, via the first actuation device and in response to the first haptic signal, the first haptic effect by changing a characteristic of a material disposed within the chamber. The method may comprise determining a second haptic effect based on a second event. The method may comprise transmitting a second haptic signal to a second actuation device, the second actuation device configured to output the second haptic effect. The method may comprise outputting, via the second actuation device and in response to the second haptic signal, the second haptic effect by transmitting an electrical signal. Yet another embodiment comprises a computer-readable medium for implementing such a method.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative illustrative embodiments and to the accompanying drawings. Each example is provided by way of explanation and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Examples of Haptic Surface Elements

Figure 1:
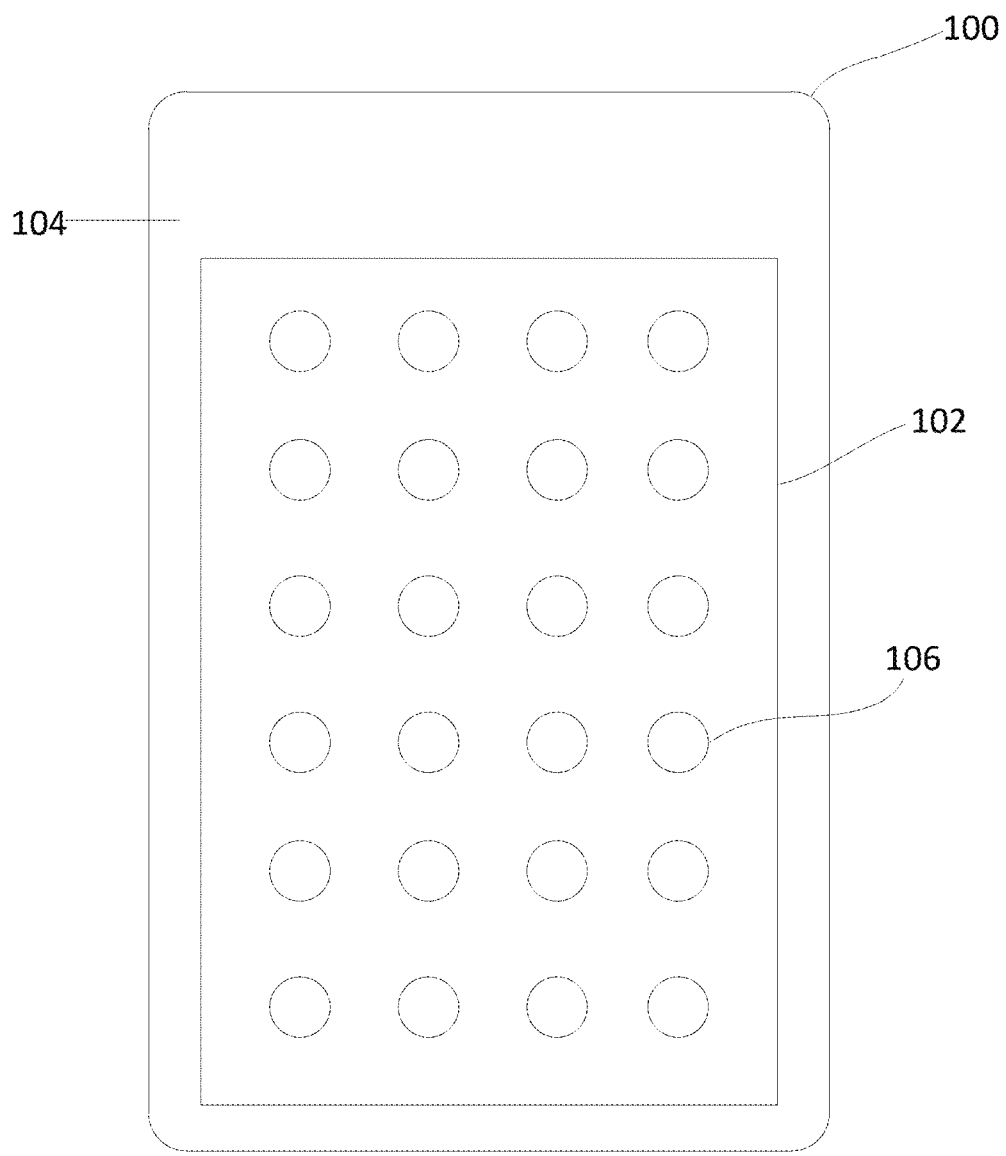
FIG. 1 shows an illustrative embodiment of a system for haptic surface elements.

FIG. 1 shows an illustrative embodiment of a system for haptic surface elements. In the illustrative embodiment, the system comprises a computing device 100, such as a tablet, e-reader, or mobile phone (e.g., a smartphone).

In the illustrative embodiment, the computing device 100 comprises a haptic output device 102. The haptic output device 102 may be coupled to the back of the computing device 100. The haptic output device 102 is configured to receive a haptic signal from the computing device 100 and output a haptic effect to the user. In some embodiments, the haptic effect comprises a texture (e.g., a bumpy, smooth, rubbery, wavy, wrinkled, and/or crumpled texture).

In the illustrative embodiment, the haptic output device 102 comprises one or more haptic cells 106. Each haptic cell 106 may be configured to deform (e.g., raise and/or lower from a surface, such as the back 104 of the computing device 100) in response to a haptic signal. The haptic cells 106 can be actuated in any arrangement or pattern to generate a haptic effect perceivable by the user.

The haptic output device 102 may comprise any number of haptic cells 106 in any arrangement and configuration. Although the haptic cells 106 are shown as having a circular shape in FIG. 1, in some embodiments, one or more of the haptic cells 106 may comprise another shape, such as a triangular, square, rectangular, or oval shape. In some embodiments, the haptic cells 106 may comprise irregular and/or customizable shapes. For example, a user may customize a shape of a haptic cell 106 by applying force to the haptic cell 106, coupling a device comprising the shape to the haptic cell 106 (e.g., overtop of the haptic cell 106), and/or providing input to the computing device 100. The computing device 100 may receive the input and responsively manipulate the shape of the haptic cell 106 (e.g., by actuating a component configured to apply a force to the haptic cell 106). In some embodiments, the haptic cells 106 may be configured according to any embodiment or combination of embodiments described in the present disclosure.

For example, in the illustrative embodiment, at least one haptic cell 106 is configured as shown in FIGS. 2A-E. In the embodiment shown in FIG. 2A, the haptic cell 106 comprises an enclosure 202. The enclosure 202 is configured to define the boundaries of a chamber 204 internal to the enclosure 202. For example, the enclosure 202 may bound the chamber 204 on at least 5 sides. A flexible layer 208 (e.g., a thin layer of material, such as a film or membrane) is coupled overtop of the enclosure 202 for defining an upper boundary of and/or enclosing the chamber 204. The enclosure 202, chamber 204, and/or flexible layer 208 may be formed using any number of materials and/or techniques, for example, as described with respect to FIG. 4.

In the illustrative embodiment, the computing device 100 may operate a haptic cell 106 at least in part by causing an actuation device 206 to pump a substance (e.g., a solid, liquid, and/or gas) into the chamber 204 of the haptic cell 106 (e.g., via a tube, such as a micro-tube). The substance may apply pressure to the flexible layer 208. This may cause the flexible layer 208 to expand, deform (e.g., change shape), and/or bend outward from the chamber 204, e.g., into the raised bump 210 shown in FIG. 2B. A user may interact with (e.g., slide a finger across) the flexible layer 208 and perceive a haptic effect comprising, e.g., a smooth bump.

Figure 2A:
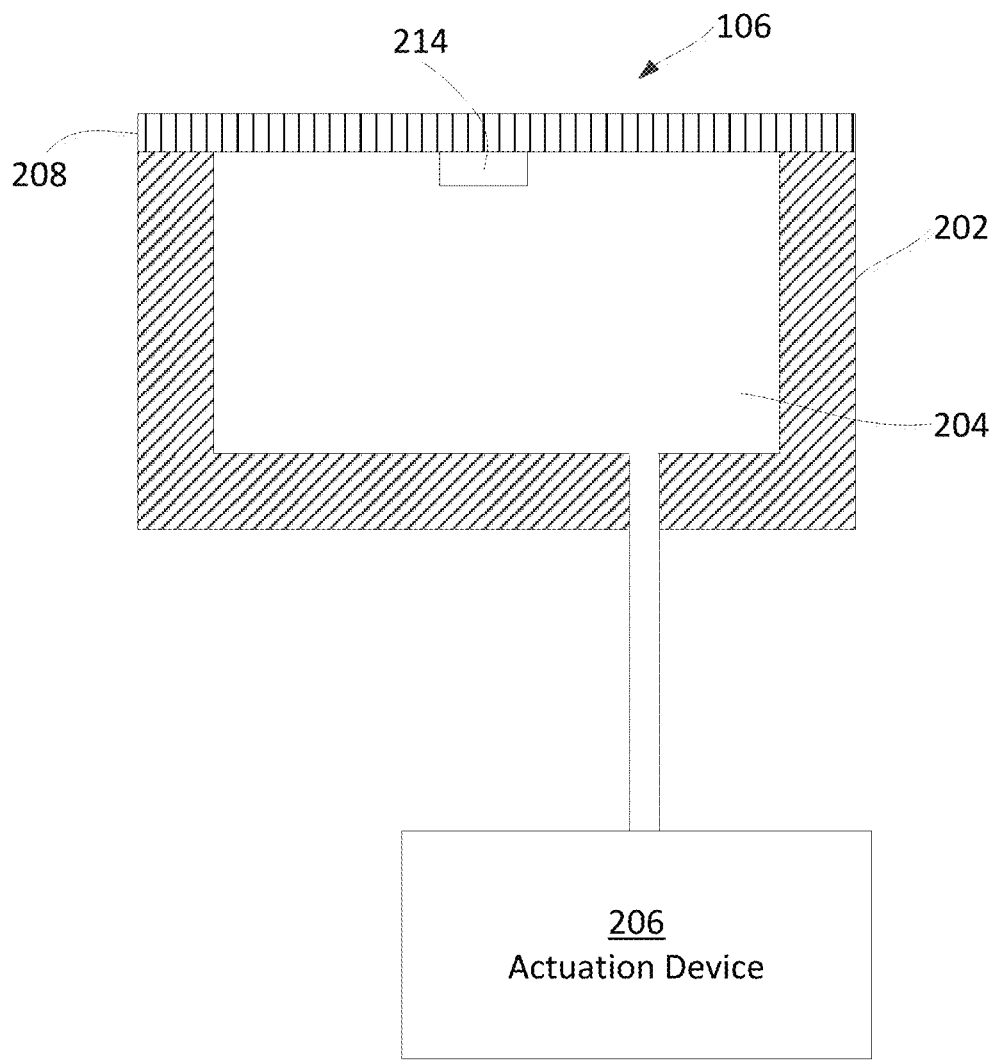
FIG. 2A shows an embodiment of a system for haptic surface elements.
Figure 2B:
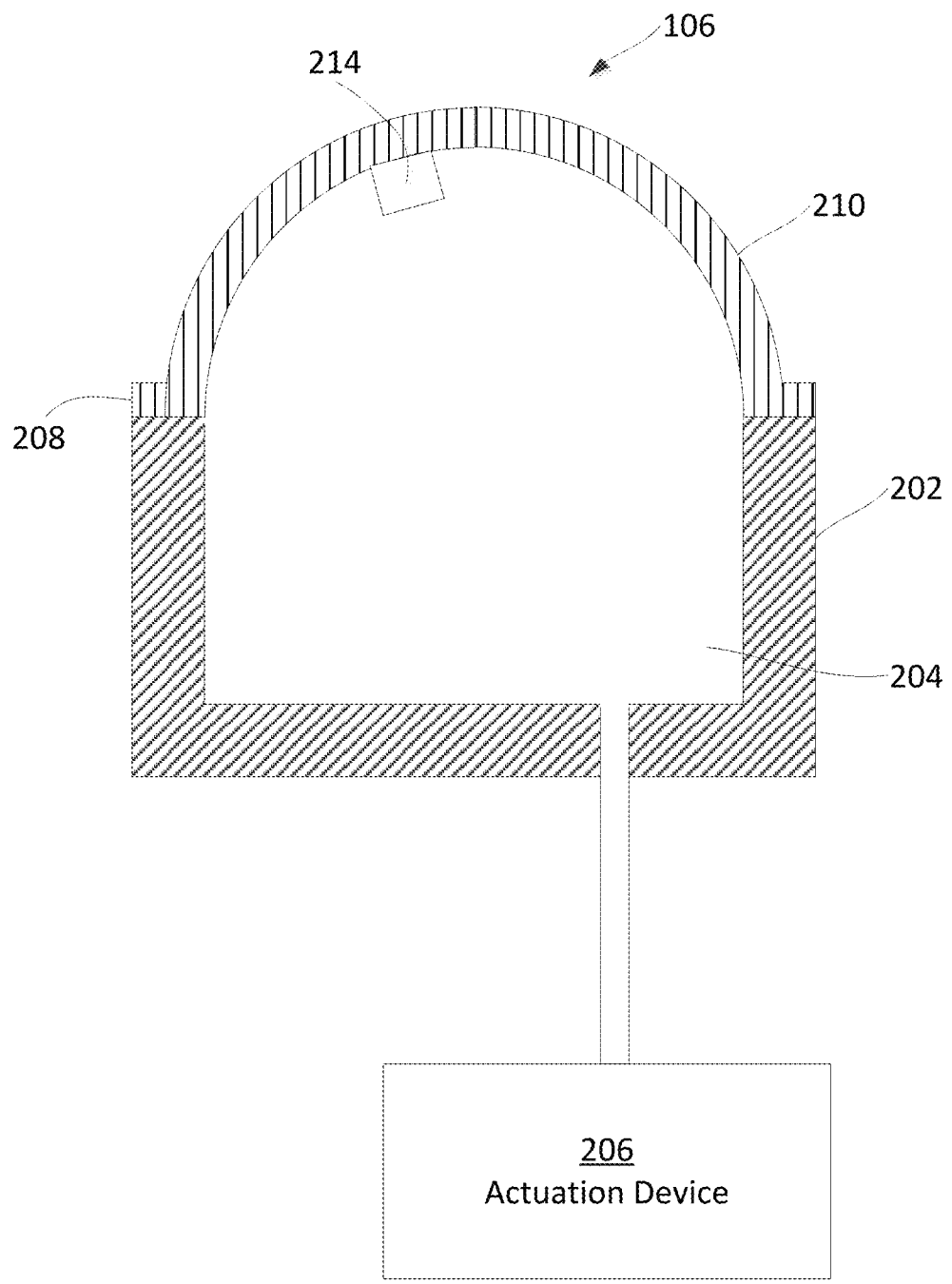
FIG. 2B shows another embodiment of a system for haptic surface elements.
Figure 2C:
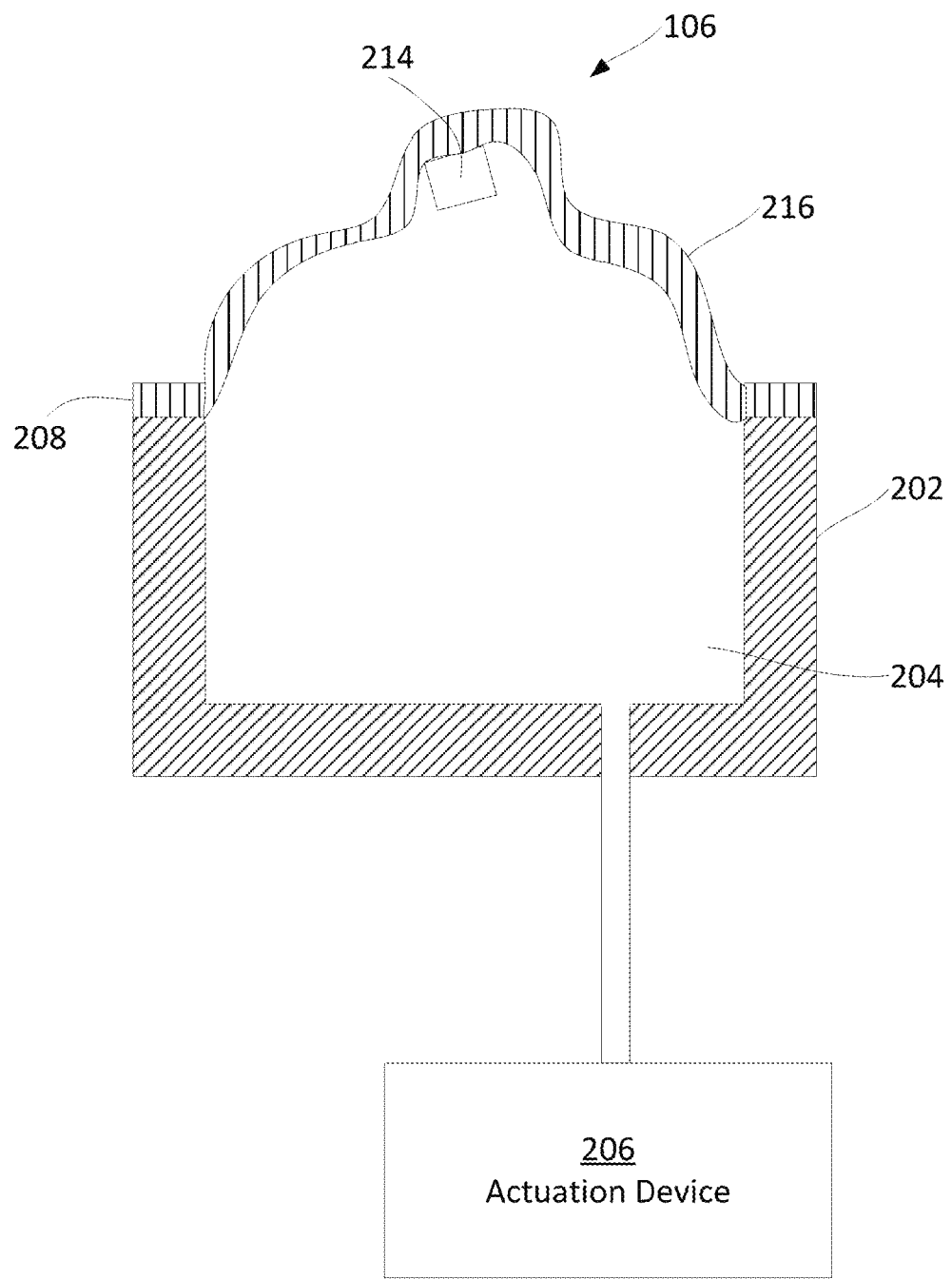
FIG. 2C shows still another embodiment of a system for haptic surface elements.
Figure 2D:
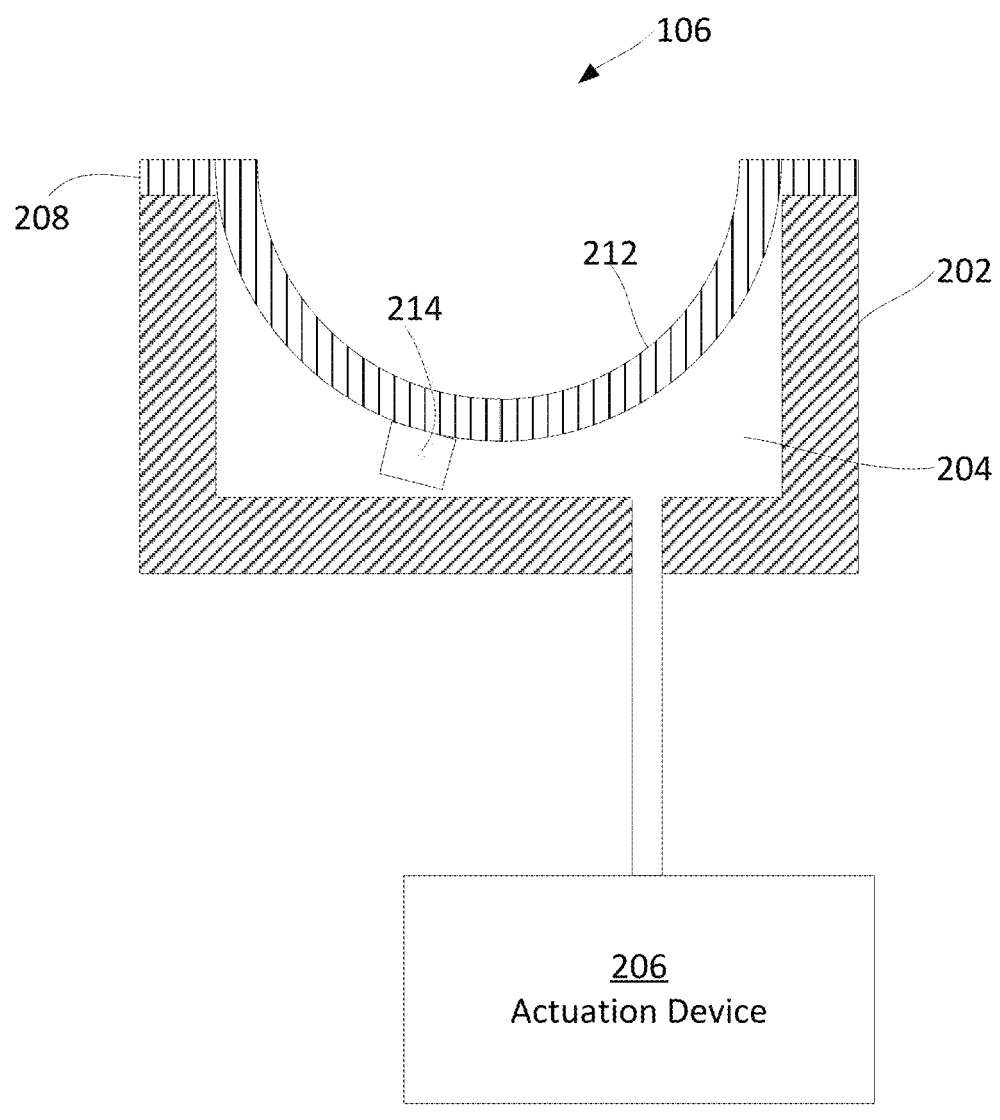
FIG. 2D shows another embodiment of a system for haptic surface elements.

In some embodiments, the computing device 100 operates the haptic cell 106 at least in part by transmitting another haptic signal to another actuation device 214 (e.g., positioned within the chamber 204 of the haptic cell 106). The actuation device 214 may receive the haptic signal and apply a stimulus to the flexible layer 208. In such an embodiment, the flexible layer 208 may comprise a smart material, shape memory alloy, and/or other material configured to respond to such a stimulus. In response to the stimulus, the flexible layer 208 may further deform in shape, e.g., as shown in FIG. 2C. A user may interact with (e.g., slide a finger across) the flexible layer 208 and perceive a haptic effect comprising a combination of the deformations to the flexible layer 208. For example, the user may slide a finger across the wavy bump 216 and perceive a haptic effect comprising, e.g., a bumpy texture. The computing device 100 may operate the actuation devices 206, 214 in any number of ways to cause the flexible layer 208 to deform into any suitable shape.

Figure 2E:
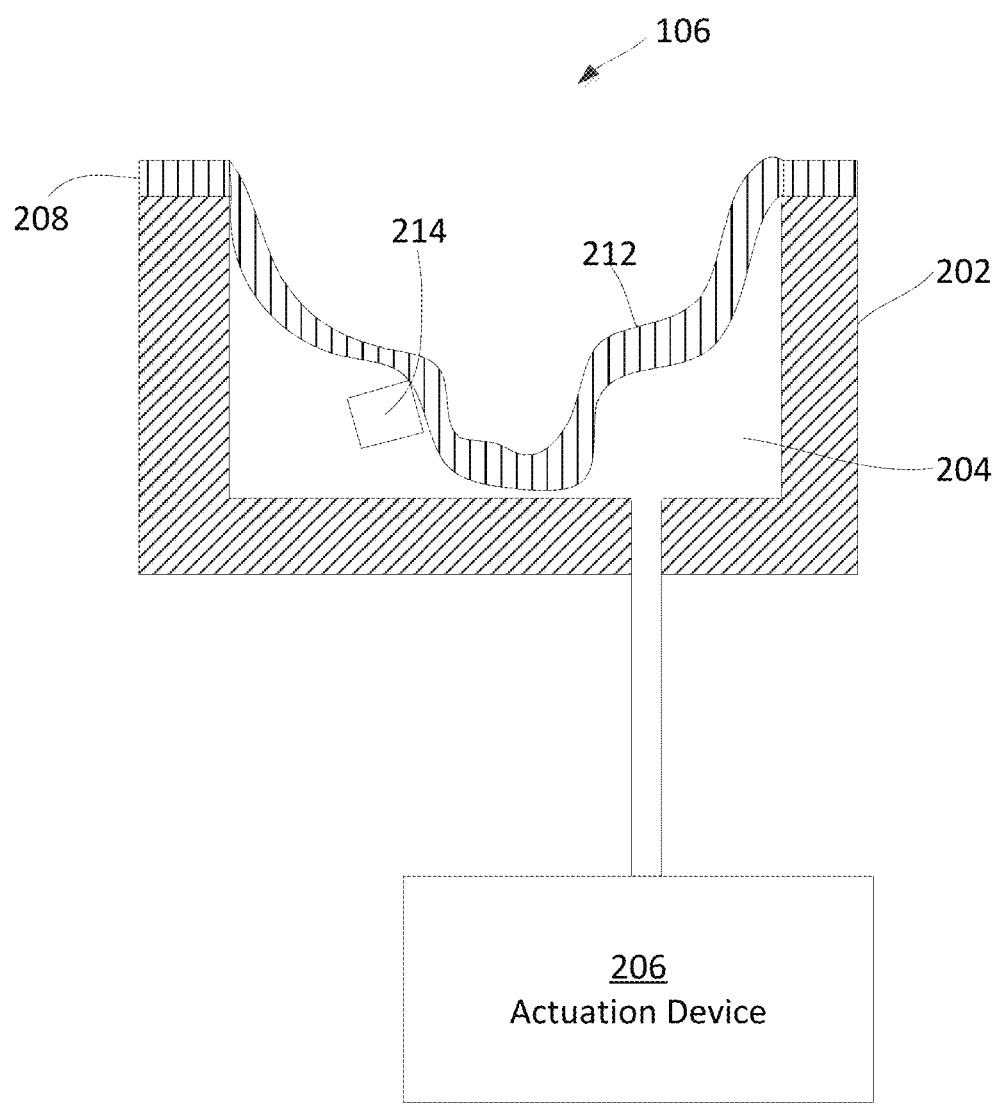
FIG. 2E shows yet another embodiment of a system for haptic surface elements.

In some embodiments, the computing device 100 may operate a haptic cell 106 at least in part by causing the actuation device 206 to remove at least a portion of the substance from the chamber 204 of the haptic cell 106. For example, the computing device 100 may cause the actuation device 206 to suction at least a portion of the substance from the chamber 204. This may cause the flexible layer 208 to deform and/or bend inward toward the interior of the chamber 204, e.g., into the concave-shaped surface 212 shown in FIG. 2D. A user may interact with the flexible layer 208 and perceive a haptic effect comprising, e.g., a smooth ridge or crevice. Additionally or alternatively, the computing device 100 may transmit another haptic signal to actuation device 214 configured to cause the actuation device 214 to apply a stimulus to the flexible layer 208. In response to the stimulus, the flexible layer 208 may further deform in shape, e.g., as shown in FIG. 2E. A user may interact with (e.g., slide a finger across) the flexible layer 208 and perceive a haptic effect comprising a combination of the deformations to the flexible layer 208. For example, the user may slide a finger across the flexible layer 208 and perceive a haptic effect comprising, e.g., a bumpy texture.

In the illustrative embodiment, the computing device 100 is configured to output a haptic effect in response to an event, such as a video game event. For example, the computing device 100 may execute a video game, such as a driving simulator in which a user can drive a virtual car. In some embodiments, the computing device 100 is configured to output a haptic effect as the virtual car passes over a virtual surface (e.g., a virtual road). The haptic effect may be configured to, e.g., simulate the texture of the virtual surface. For example, the computing device 100 may, e.g., cause every other haptic cell 106 in the haptic output device 102 to output a wavy bump 216 in response to the user's virtual car driving over a bumpy virtual surface. The user may be able to interact with the haptic output device 102 and feel the wavy bumps 216 of the haptic cells 106. The user may perceive the wavy bumps 216 as a haptic effect comprising, e.g., a bumpy texture.

The description of the illustrative embodiment above is provided merely as an example. Various other embodiments of the present invention are described herein and variations of such embodiments would be understood by one of skill in the art. Advantages offered by various embodiments may be further understood by examining this specification and/or by practicing one or more embodiments of the claimed subject matter.

Illustrative Systems for Haptic Surface Elements

Figure 3:
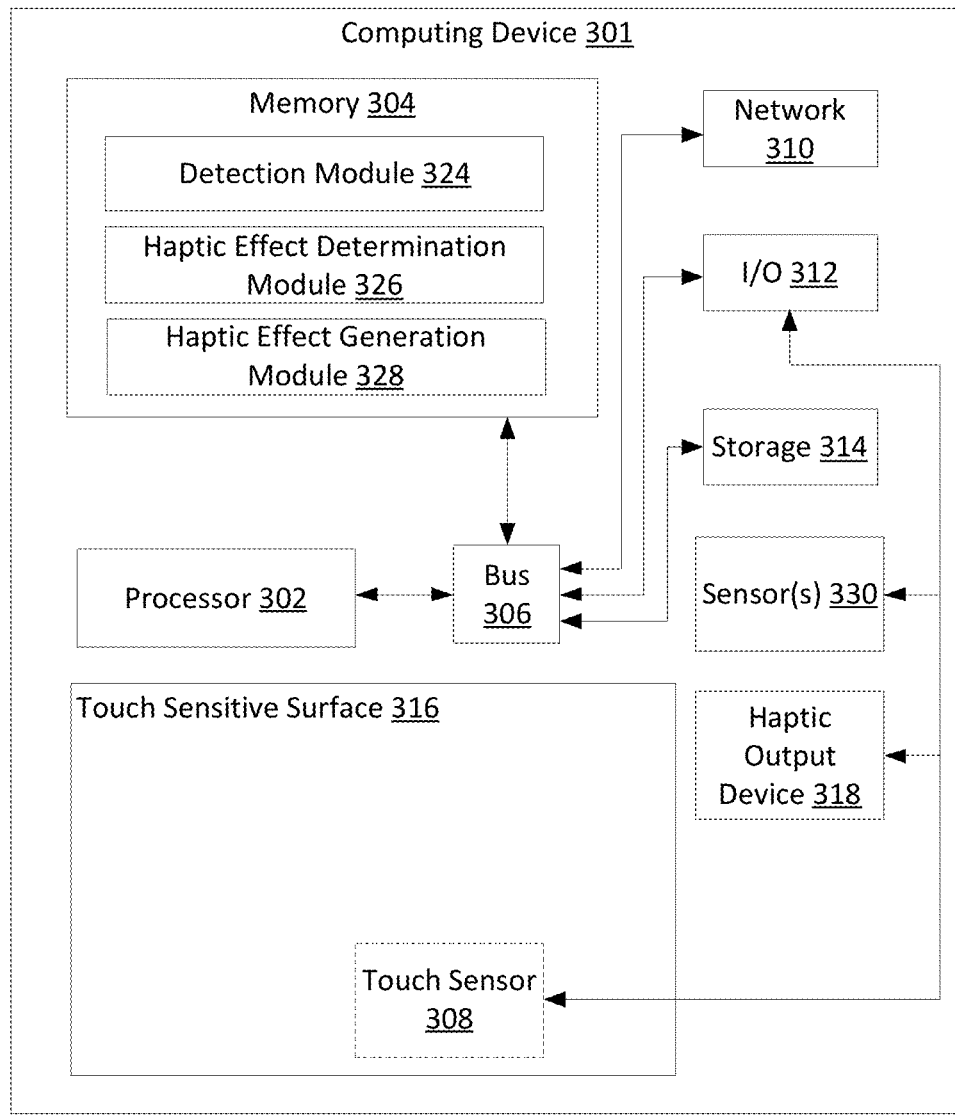
FIG. 3 is a block diagram showing an embodiment of a system for haptic surface elements.

FIG. 3 is a block diagram showing a computing device 301 for haptic surface elements according to one embodiment. The computing device 301 may comprise a mobile device (e.g., smartphone), laptop computer, desktop computer, tablet, e-reader, game controller, gamepad, remote control, and/or a portable gaming device.

In some embodiments, the components (e.g., the processor 302, network interface device 310, haptic output device 318, sensor 330, etc.) of the computing device 301 may be integrated into a single housing. In other embodiments, the components may be distributed (e.g., among multiple housings or locations) and in electrical communication with one another. The computing device 301 may or may not comprise all of the components depicted in FIG. 3. For example, in some embodiments, the computing device 301 may not comprise the sensor 330.

The computing device 301 comprises a processor 302 interfaced with other hardware via bus 306. A memory 304, which can comprise any suitable tangible (and non-transitory) computer-readable medium such as RAM, ROM, EEPROM, or the like, may embody program components that configure operation of the computing device 301. In some embodiments, the computing device 301 may further comprise one or more network interface devices 310, input/output (I/O) interface components 312, and additional storage 314.

Network interface device 310 can represent one or more of any components that facilitate a network connection or otherwise facilitate communication between electronic devices. Examples include, but are not limited to, wired interfaces such as Ethernet, USB, IEEE 1394, and/or wireless interfaces such as IEEE 802.11, Bluetooth, near-field communication (NFC) interfaces, RFID interfaces, or radio interfaces for accessing cellular telephone networks (e.g., transceiver/antenna for accessing a CDMA, GSM, UMTS, or other mobile communications network).

I/O components 312 may be used to facilitate connection to devices such as one or more displays, touch sensitive surfaces 316, keyboards, mice, speakers, microphones, buttons, and/or other hardware used to input data or output data. Storage 314 represents nonvolatile storage such as read-only memory, flash memory, ferroelectric RAM (F-RAM), magnetic, optical, or other storage media included in the computing device 301 or coupled to processor 302.

The computing device 301 may comprise a touch sensitive surface 316. In some embodiments, the touch sensitive surface 316 is flexible or deformable. Touch sensitive surface 316 represents any surface that is configured to sense tactile input of a user. One or more touch sensors 308 are configured to detect a touch in a touch area (e.g., when an object contacts a touch sensitive surface 316) and transmit signals associated with the touch to processor 302. Any suitable number, type, or arrangement of touch sensors 308 can be used. For example, in some embodiments, resistive and/or capacitive sensors may be embedded in touch sensitive surface 316 and used to determine the location of a touch and other information, such as pressure, speed, direction, and/or the proximity of a user's finger to the touch sensitive surface 316. In such an embodiment, capacitive sensors may detect the proximity of a user's finger to the touch sensor 308 (e.g., embedded in the touch sensitive surface 316). For example, the touch sensor 308 may comprise a capacitive sensor configured to detect a change in capacitance as a user's finger approaches the touch sensor 308. The touch sensor 308 may determine whether the user's finger is within a particular distance of the touch sensor 308 based on the change in capacitance.

The touch sensor 308 can additionally or alternatively comprise other types of sensors. For example, optical sensors with a view of the touch sensitive surface 316 may be used to determine the touch position. As another example, the touch sensor 308 may comprise a LED (Light Emitting Diode) finger detector mounted on the side of a display. In some embodiments, touch sensor 308 may be configured to detect multiple aspects of the user interaction. For example, touch sensor 308 may detect the speed, pressure, and direction of a user interaction, and incorporate this information into the signal transmitted to the processor 302.

In some embodiments, the computing device 301 comprises a touch-enabled display that combines a touch sensitive surface 316 and a display of the device. The touch sensitive surface 316 may correspond to the display exterior or one or more layers of material above components of the display. In other embodiments, touch sensitive surface 316 may not comprise (or otherwise correspond to) a display, depending on the particular configuration of the computing device 301.

In some embodiments, the computing device 301 comprises one or more additional sensor(s) 330. The sensor(s) 330 are configured to transmit sensor signals to the processor 302. The sensor(s) 330 may comprise, for example, a humidity sensor, ambient light sensor, gyroscope, GPS unit, accelerometer, range sensor, depth sensor, biosensor, camera, moisture sensor, fluid sensor, and/or temperature sensor. In some embodiments, the computing device 301 outputs one or more haptic effects based at least in part on sensor signals from sensor 330. For example, in some embodiments, the computing device 301 may execute a navigation application. In such an embodiment, the computing device 301 may determine a user's GPS location and output associated haptic effects configured to, e.g., provide directional information to a user. For example, the computing device 301 may actuate a plurality of haptic cells to output a texture (e.g., a bumpy texture) on the right side of the computing device 301 if the user is supposed to turn right and/or a texture on the left side of the computing device 301 if the user is supposed to turn left. The user may perceive the texture and determine which direction to turn.

The computing device 301 comprises a haptic output device 318 in communication with the processor 302. The haptic output device 318 is configured to output a haptic effect in response to a haptic signal. In some embodiments, the haptic effect comprises a texture, a vibration, a change in a perceived coefficient of friction, a change in temperature, a stroking sensation, an electro-tactile effect, and/or a surface deformation (e.g., a deformation of a surface associated with the computing device 301).

In some embodiments, the haptic output device 318 comprises one or more haptic cells (e.g., as shown in FIG. 1). The one or more haptic cells may be configured, for example, as described with respect to any of FIGS. 2 and 4-8. The computing device 301 may actuate one or more haptic cells of the haptic output device 318 to produce a haptic effect (e.g., a texture). The computing device 301 can actuate any number of haptic cells, in any pattern, shape, or configuration to generate the haptic effect. For example, the computing device 301 may execute a weather application. The computing device 301 may be configured to output a haptic effect associated with the weather. For example, if the weather application indicates a high chance of rain, the computing device 301 may actuate a plurality of haptic cells in a pattern, e.g., configured to simulate the shape of a water droplet. If the weather application indicates thunderstorms approaching, the computing device 301 may actuate a plurality of haptic cells in a pattern, e.g., configured to simulate the shape of a lightning bolt. A user may slide a finger over the haptic output device 318 and perceive the pattern. The pattern may indicate to the user, e.g., that there is a high chance of rain and/or thunderstorms, respectively.

In some embodiments, the haptic output device 318 may be a portion of the housing of the computing device 301. In other embodiments, the haptic output device 318 may overlay a surface associated with the computing device 301. The surface may comprise, for example, a front, back, and/or side of the computing device 301; a user interface device, such as the touch sensitive surface 316, a touch-screen display, a button, or a joystick; and/or an output device, such as a display. In embodiments in which the haptic output device 318 overlays at least a portion of the display, the haptic output device 318 may comprise clear or transparent materials (e.g., to allow a user to view the display). In other embodiments, the haptic output device 318 may comprise opaque or colored materials (e.g., to blend in with, or provide coloring to, the computing device 301).

In some embodiments, the haptic output device 318 is external to computing device 301 and in communication with the computing device 301 (e.g., via wired interfaces such as Ethernet, USB, IEEE 1394, and/or wireless interfaces such as IEEE 802.11, Bluetooth, or radio interfaces). For example, the haptic output device 318 may be associated with (e.g., coupled to) a remote user interface device (e.g., a wireless joystick, game pad, and/or Braille interface) and configured to output haptic effects in response to haptic signals from the processor 302. In some embodiments, the haptic output device 318 may be associated with a wearable device (e.g., a ring, bracelet, watch, sleeve, collar, hat, shirt, glove, and/or glasses) and/or coupled to a user's body and configured to output haptic effects in response to haptic signals from the processor 302.

Although a single haptic output device 318 is shown in FIG. 3, in some embodiments, the computing device 301 comprises multiple haptic output devices 318 of the same or different type to produce haptic effects. For example, the computing device 301 may comprise haptic output device 318 (e.g., which may comprise at least one haptic cell) and a different haptic output device 318 (e.g., configured to output a vibro-tactile haptic effect). In some embodiments, the computing device 301 may actuate multiple haptic output devices 318 of the same or different types in sequence and/or in concert to generate one or more haptic effects.

In some embodiments, the haptic output device 318 is configured to output a haptic effect comprising a vibration. The haptic output device 318 may comprise, for example, one or more of a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA).

In some embodiments, the haptic output device 318 is configured to output a haptic effect modulating the perceived coefficient of friction of a surface associated with the haptic output device 318. In one embodiment, the haptic output device 318 comprises an ultrasonic actuator. An ultrasonic actuator may vibrate at an ultrasonic frequency, for example 20 kHz, increasing or reducing the perceived coefficient of an associated surface. In some embodiments, the ultrasonic actuator may comprise a piezo-electric material.

In some embodiments, the haptic output device 318 uses electrostatic attraction, for example by use of an electrostatic actuator, to output a haptic effect. The haptic effect may comprise a simulated texture, a simulated vibration, a stroking sensation, or a perceived change in a coefficient of friction on a surface associated with computing device 301.

In some embodiments, the electrostatic actuator may comprise a conducting layer and an insulating layer. The conducting layer may be any semiconductor or other conductive material, such as copper, aluminum, gold, or silver. The insulating layer may be glass, plastic, polymer, or any other insulating material. Furthermore, the processor 302 may operate the electrostatic actuator by applying an electric signal, for example an AC signal, to the conducting layer. In some embodiments, a high-voltage amplifier may generate the AC signal. The electric signal may generate a capacitive coupling between the conducting layer and an object (e.g., a user's finger or other body part, or a stylus) near or touching the haptic output device 318. Varying the levels of attraction between the object and the conducting layer can vary the haptic effect perceived by a user.

In some embodiments, the haptic output device 318 comprises a deformation device configured to output a deformation haptic effect. The deformation haptic effect may comprise bending, folding, rolling, twisting, squeezing, flexing, changing the shape of, or otherwise deforming a surface associated with the computing device 301. For example, the deformation haptic effect may apply a force on the computing device 301 or a surface associated with the computing device 301, causing it to bend, fold, roll, twist, squeeze, flex, change shape, and/or otherwise deform. For instance, if the computing device 301 is executing a virtual skateboarding half-pipe game, the deformation haptic effect may comprise bending the computing device 201 in an amount corresponding to the bend in the virtual half pipe. This may more realistically simulate features of the virtual half pipe for the user.

In some embodiments, the haptic output device 318 comprises gel configured for outputting a deformation haptic effect (e.g., for bending or deforming a surface associated with the computing device 301). For example, the haptic output device 318 may comprise a smart gel. A smart gel may comprise a fluid in a polymer matrix with mechanical or structural properties that change in response to a stimulus or stimuli (e.g., an electric field, a magnetic field, temperature, ultraviolet light, shaking, or a pH variation). For instance, in response to a stimulus, a smart gel may change in stiffness, volume, transparency, and/or color. Stiffness may comprise the resistance of a surface associated with the computing device 301 against deformation. In some embodiments, one or more wires may be embedded in or coupled to the smart gel. As current runs through the wires, heat is emitted, causing the smart gel to expand, contract, or otherwise change shape. This may cause the computing device 301 or a surface associated with the haptic output device 318 to deform. In some embodiments, a device (e.g., an electromagnet) may be positioned near the smart gel for applying a magnetic and/or an electric field to the smart gel. The smart gel may expand, contract, or otherwise change shape in response to the magnetic and/or electric field. This may cause the computing device 301 or a surface associated with the haptic output device 318 to deform.

As another example, the haptic output device 318 may comprise a rheological (e.g., a magneto-rheological or electro-rheological) fluid. A rheological fluid comprises metal particles (e.g., iron particles) suspended in a fluid (e.g., oil or water). In response to an electric or magnetic field, the order of the molecules in the fluid may realign, changing the overall damping and/or viscosity of the fluid. This may cause the computing device 301 or a surface associated with the haptic output device 318 to deform.

In some embodiments, the haptic output device 318 comprises a mechanical deformation device. For example, in some embodiments, the haptic output device 318 may comprise an actuator coupled to an arm that rotates a deformation component. The deformation component may comprise, for example, an oval, starburst, or corrugated shape. The deformation component may be configured to move a surface associated with the haptic output device 318 at some rotation angles but not others. The actuator may comprise a piezo-electric actuator, rotating/linear actuator, solenoid, an electroactive polymer actuator, macro fiber composite (MFC) actuator, shape memory alloy (SMA) actuator, and/or other actuator. As the actuator rotates the deformation component, the deformation component may move the surface, causing it to deform. In such an embodiment, the deformation component may begin in a position in which the surface is flat. In response to receiving a signal from processor 302, the actuator may rotate the deformation component. Rotating the deformation component may cause one or more portions of the surface to raise or lower. The deformation component may, in some embodiments, remain in this rotated state until the processor 302 signals the actuator to rotate the deformation component back to its original position.

Further, other techniques or methods can be used to deform a surface associated with the computing device 301. For example, the haptic output device 318 may comprise a flexible surface layer configured to deform its surface or vary its texture based upon contact from a surface reconfigurable haptic substrate (including, but not limited to, e.g., fibers, nanotubes, electroactive polymers, piezoelectric elements, or shape memory alloys). In some embodiments, the haptic output device 318 is deformed, for example, with a deforming mechanism (e.g., a motor coupled to wires), local deformation of materials, resonant mechanical elements, piezoelectric materials, micro-electromechanical systems ("MEMS") elements, variable porosity membranes, or laminar flow modulation.

Turning to memory 304, illustrative program components 324, 326, and 328 are depicted to illustrate how a device can be configured in some embodiments to provide haptic surface elements. In this example, a detection module 324 configures processor 302 to monitor the touch sensitive surface 316 via touch sensor 308 to determine a position of a touch. For example, detection module 324 may sample the touch sensor 308 in order to track the presence or absence of a touch and, if a touch is present, to track one or more of the location, path, velocity, acceleration, pressure and/or other characteristics of the touch over time.

Haptic effect determination module 326 represents a program component that analyzes data to select a haptic effect to generate. Particularly, haptic effect determination module 326 may comprise code that determines a haptic effect to output to the user. Further, haptic effect determination module 326 may comprise code that selects one or more haptic effects to provide, and/or one or more haptic output devices 318 (e.g., one or more haptic cells within a haptic output device 318) to actuate, in order to generate the haptic effect.

In some embodiments, haptic effect determination module 326 may comprise code that determines, based on an interaction with the touch sensitive surface 316, a haptic effect to output and code that selects one or more haptic effects to provide in order to output the effect. For example, the computing device 301 may execute a video game. The computing device 301 may output virtual objects associated with the video game on a touch-screen display (e.g., comprising touch sensitive surface 316). In some embodiments, the computing device 301 may detect a user interaction (e.g., tapping or making a gesture, such as a two-finger pinch, on the touch sensitive surface 316) with a virtual object output on the touch-screen display. Based on the location of the user interaction and/or a characteristic (e.g., texture, size, color, etc.) of the virtual object, the haptic effect determination module 326 may select a haptic effect to generate. For example, the haptic effect determination module 326 may determine a haptic effect comprising a sandy, rocky, watery, wavy, or bumpy texture if the virtual object comprises a sandy, rocky, watery, wavy, or bumpy texture, respectively.

In some embodiments, haptic effect determination module 326 may determine haptic effects based on other kinds of events. For example, the haptic effect determination module 326 may determine a haptic effect based on a system status, such as a low battery status. In such an embodiment, the haptic effect determination module 326 may determine a haptic effect comprising, e.g., a particular texture configured to indicate to the user that the user needs to charge the computing device 301. In some embodiments, the characteristics of the haptic effect may depend on the characteristics of the system status. For example, the size of the area of the computing device 301 comprising the texture may be inversely proportional to the amount of battery life left. A user may be able to slide a finger over a surface of the computing device 301 and determine how much battery life the computing device 301 has based on the size of the area comprising the texture.

In some embodiments, the haptic effect determination module 326 may determine a haptic effect configured to provide the user with information. For example, the haptic effect determination module 326 may determine a haptic effect comprising, e.g., a texture. The haptic effect may be configured to indicate to the user, e.g., that the user has a missed phone call, text message, e-mail, instant message, and/or other communication.

In some embodiments, the haptic effect determination module 326 may determine a haptic effect based on a program event (e.g., an error notification). In some embodiments, the characteristics of the haptic effect may depend on the characteristics of the program event (e.g., the type of haptic effect may be based on the type of error). For example, if the program event comprises a program failure, the haptic effect determination module 326 may determine an associated haptic effect comprising, e.g., a texture. The texture may comprise raised bumps in the form of an "X" or a frowny face (e.g., ☹). In some embodiments, a user may interact with the texture and determine, based on the characteristics of the texture, that the program event (e.g., program failure) occurred.

Haptic effect generation module 328 represents programming that causes processor 302 to generate and transmit a haptic signal to the haptic output device 318 to generate the selected haptic effect. For example, the haptic effect generation module 328 may access stored waveforms or commands to send to haptic output device 318. As another example, haptic effect generation module 328 may comprise algorithms to determine the haptic signal. Haptic effect generation module 328 may comprise algorithms to determine target coordinates for the haptic effect. These target coordinates may comprise, for example, a location on the touch sensitive surface 316 or on a surface of the computing device 301 in which to output the haptic effect (e.g., a texture).

Figure 4:
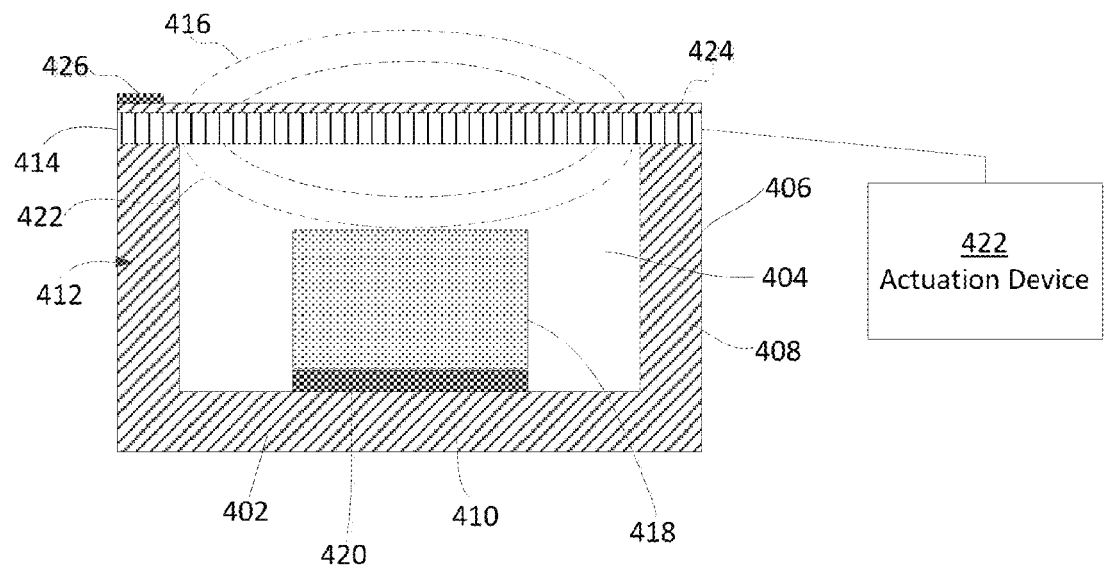
FIG. 4 shows an embodiment of a system for haptic surface elements.

FIG. 4 shows an embodiment of a system for haptic surface elements. The system includes a haptic cell comprising a base material 402. The base material 402 may comprise any suitable material or combination of materials.

For example, the base material 402 may comprise a polymer (e.g., plastic and/or rubber) and/or glass.

In some embodiments, the haptic cell comprises a chamber 404. The chamber 404 may comprise a channel or hole drilled, molded, and/or otherwise formed into the base material 402 using any technique or combination of techniques. For example, in some embodiments, the chamber 404 is formed into the base material 402 via injection molding. In such an embodiment, the base material 402 (e.g., a polymer) may be heated until the base material 402 becomes soft or changes into a liquid state. The base material 402 may be poured into one or more molds and cooled. Cooling the base material 402 may cause the base material 402 to conform to and harden around one or more features of the mold(s). The one or more features of the mold may be configured to form the chamber 404 into the base material 402. The hardened base material 402 can be extracted from the mold and may comprise the chamber 404.

As another example, in some embodiments, lithography may be used to generate the chamber 404. In one such embodiment, a manufacturer can position a photoresist material (e.g., an epoxy-based negative photoresist material) or other photosensitive material on a silicon substrate. The base material 402 may comprise the photoresist material and/or the silicon substrate. The photoresist material may be etched, e.g., using a radiation source (such as ultraviolet light), to define the chamber 404 in the base material 402.

As still another example, in some embodiments, a manufacturer may laser etch, apply focused ion beams, and/or apply other methods to a base material 402 to form the chamber 404. The chamber 404 may comprise any suitable size (e.g., length, width, and/or diameter). For example, the chamber 404 may comprise a micro-channel formed into the base material 402.

Forming the chamber 404 within the base material 402 may generate an enclosure 406 surrounding the chamber 404. The enclosure 406 may comprise one or more walls 408, 410, 412 defining an outer boundary of the chamber 404.

In some embodiments, the haptic cell comprises a flexible layer 414 configured to deform (e.g., bend, flex, or otherwise change shape). The flexible layer 414 may comprise a polymer. In some embodiments, the flexible layer 414 is coupled over the top of the chamber 404 and/or enclosure 406. The flexible layer 414 may define an upper boundary of and seal closed the chamber 404.

In some embodiments, the chamber 404 comprises an actuation device 420 configured to actuate the haptic cell (e.g., to output a haptic effect). For example, in some embodiments, the actuation device 420 comprises a heating element, an acidic substance, a basic substance, a light (e.g., a light emitting diode), an electrode, and/or an electromagnet. The actuation device 420 may be configured to apply, for example, heat, the acidic substance, the basic substance, light, electricity, a magnetic field, an electric field, electricity, and/or any other stimulus to one or more substances 418 (e.g., paraffin wax, a smart gel, a shape memory material, a piezoelectric material, and/or any other suitable material) within the chamber 404. In some embodiments, the substance 418 expands, contracts, changes shape, changes physical state, and/or otherwise responds to the stimulus output by the actuation device 420. This may cause the substance 418 to apply pressure to, or otherwise interact with, the flexible layer 414. The interaction between the substance 418 and the flexible layer 414 may cause the flexible layer 414 to deform in shape. A user may interact with the deformed flexible layer 414 (e.g., by sliding a finger across the flexible layer 414) and perceive a haptic effect.

As an example, in some embodiments, the substance 418 comprises a smart material, such as a smart gel. In some embodiments, the actuation device 420 may apply a stimulus (e.g., light) to the smart material to actuate the haptic cell. The stimulus may cause the smart material to expand, contract, and/or otherwise deform. In some embodiments, the smart material is coupled to the flexible layer 414 and the enclosure 406. For example, the smart material may be coupled on one end to the flexible layer 414 and on another end to a wall 408, 410, 412 (e.g., bottom wall 410) of the enclosure 406. The deformation (e.g., contraction) of the smart material may pull the flexible layer 414 toward, or push the flexible layer 414 away from, the bottom wall 410 of the enclosure 406. This can cause the flexible layer 414 to bend inward (e.g., as shown by dashed lines 422) or bend outward (e.g., as shown by dashed lines 416), respectively, and/or otherwise deform.

As another example, in some embodiments, the substance 418 comprises a piezoelectric material. The actuation device 420 may apply a stimulus (e.g., electricity) to the smart material to actuate the haptic cell. The stimulus may cause the piezoelectric material to expand, contract, and/or otherwise deform. In some embodiments, the piezoelectric material is coupled to the flexible layer 414 and the enclosure 406. For example, the piezoelectric material may be coupled on one end to the flexible layer 414 and on another end to a wall 408, 410, 412 (e.g., bottom wall 410) of the enclosure 406. In some embodiments, the deformation (e.g., contraction) of the piezoelectric material may pull the flexible layer 414 toward, or push the flexible layer 414 away from, the bottom wall 410 of the enclosure 406. This can cause the flexible layer 414 to bend inward or bend outward, respectively, and/or otherwise deform.

In some embodiments, the actuation device 420 comprises a robot (e.g., a micro-robot). The robot may be configured to move within the chamber 404 of the haptic cell. In some embodiments, the robot may be controllable (e.g., wirelessly or via a wired interface) by a user or a computing device. For example, the robot may wirelessly receive (e.g., via Bluetooth or WiFi) one or more control signals and responsively move within the chamber 404 and/or otherwise manipulate the flexible layer 414.

In some embodiments, an actuation device 422 maybe coupled to the flexible layer 414 for causing the flexible layer 414 to generate a haptic effect. For example, in one embodiment, the flexible layer 414 may comprise a conducting layer (e.g., a flexible conducting layer) of an electrostatic actuator. An insulating layer 424 (e.g., a flexible insulation layer) may be positioned overtop of the flexible layer 414, e.g., to protect a user from directly contacting the conducting layer. In such an embodiment, the actuation device 422 may be configured to transmit a haptic signal configured to cause the conducting layer to generate a haptic effect comprising a capacitive coupling with an object near the flexible layer 414.

In some embodiments, the flexible layer 414 may comprise a conductor or other material for outputting an electrotactile haptic effect to a user contacting the flexible layer 414. In other embodiments, the flexible layer 414 may comprise a conductor or other material for outputting a thermal haptic effect (e.g., an increase or decrease in temperature) to a user near or contacting the flexible layer 414. The actuation device 422 may be configured to transmit a haptic signal to the flexible layer 414 to cause the electrotactile or thermal haptic effect. For example, the actuation device 411 may transmit a high voltage to a conductive material within the flexible layer 414 for causing the flexible layer 414 to generate heat. The user may perceive the heat as a thermal haptic effect.

In some embodiments, a sensor 426 may be coupled to the haptic cell. The sensor 426 may comprise, for example, a temperature sensor configured to detect a temperature at the surface of the flexible layer 414 and transmit a sensor signal to a computing device. In some embodiments, the computing device can modulate a temperature at the flexible layer 414 (e.g., when the flexible layer 414 is configured to output a thermal haptic effect) based on the sensor signal from the sensor 426. For example, the computing device may control the actuation device 422 to modify the temperature at the flexible layer 414 until a particular temperature is reached, such as a temperature configured to simulate a particular texture or feature of an object. For example, in response to a video game event in which a user's virtual character is traversing simulated lava, the computing device may cause the actuation device 422 to generate a thermal haptic effect comprising a particular amount of heat configured to passing over simulate lava.

In some embodiments, a computing device may concurrently or sequentially actuate the actuation devices 420, 422 to generate a haptic effect, such as a combined haptic effect. For example, the computing device may cause the actuation device 420 to bend the flexible layer 414 outward, e.g., into the shape of a bump. The computing device may substantially simultaneously cause the actuation device 422 to generate an electrostatic haptic effect, e.g., configured to simulate a rubber material. A user contacting the flexible layer 414 (e.g., sliding a finger across the flexible layer 414) may perceive the combination of the haptic effects as, e.g., a rubber bump.

In some embodiments, the flexible layer 414 itself is configured to deform in response to a stimulus. In such an embodiment, the haptic cell may not comprise the substance 418. For example, the flexible layer 414 may comprise a liquid crystal polymer, a smart material, an electroactive polymer (EAP), and/or shape memory material (e.g., a shape memory alloy and/or a shape memory polymer). In such an embodiment, the actuation device 420 (or the actuation device 422) may apply the stimulus to the flexible layer 414 (e.g., may apply the stimulus directly to the flexible layer 414) to cause the flexible layer 414 to deform. For example, the actuation device 420 may apply an electric field, a magnetic field, heat, and/or another stimulus to the flexible layer 414 to cause the flexible layer 414 to expand. The expansion of the flexible layer 414 may generate stress within the flexible layer 414, e.g., because the ends of the flexible layer 414 may be coupled to the walls 408, 410, 412 of the enclosure 406. The stress may cause the flexible layer 414 to bend outward (e.g., as shown by dashed lines 416), bend inward (e.g., as shown by dashed lines 422), and/or otherwise deform.

In some embodiments, the actuation device 420 (or the actuation device 422) may apply the stimulus to the flexible layer 414 configured to cause the flexible layer 414 to bend inward, which may generate a suction between a user's finger contacting the flexible layer 414 and the flexible layer 414. The user may perceive the suction as a haptic effect.

The actuation devices 420, 422 may be positioned in any suitable location (e.g., internal to the chamber 404, external to the chamber 404, external to the enclosure 406, and/or external to the haptic cell) for applying a stimulus to the flexible layer 414 and/or the substance 418. For example, although the actuation device 420 is positioned on the bottom wall 410 of the enclosure 406 in FIG. 4, in other embodiments, the actuation device 420 may be directly coupled to the flexible layer 414 (e.g., an underside of the flexible layer 414 internal to the chamber 404). As another example, in some embodiments, the actuation device 420 is positioned externally to the chamber 404 and/or the haptic cell.

Figure 5:
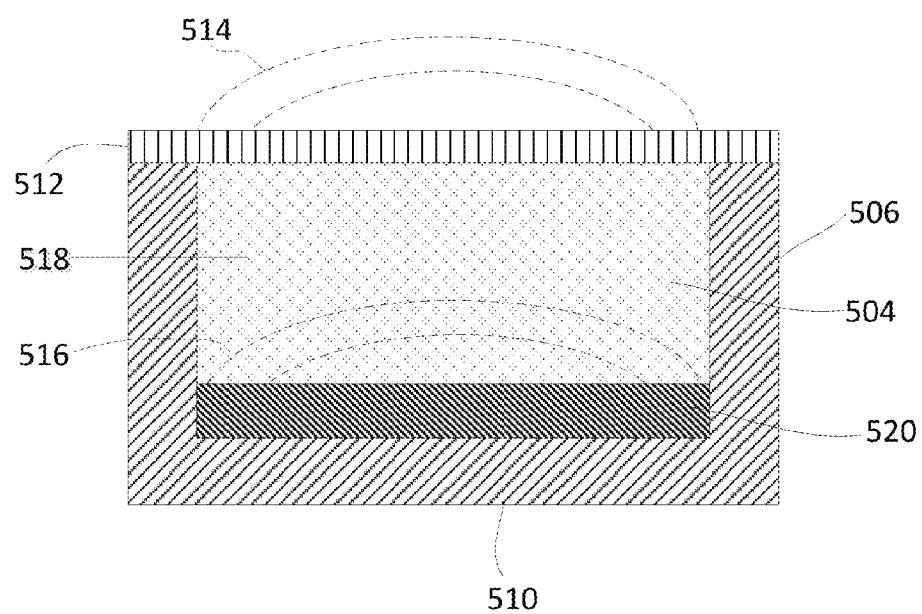
FIG. 5 shows another embodiment of a system for haptic surface elements.

FIG. 5 shows another embodiment of a system for haptic surface elements. The system includes haptic cell comprising an enclosure 506, a chamber 504, and a flexible layer 512 configured substantially similar to the enclosure 406, chamber 404, and flexible layer 414, respectively, of FIG. 4. The components shown in FIG. 5 can be formed using any of the methods discussed with respect to FIG. 4.

In the embodiment shown in FIG. 5, the chamber 504 comprises a substance 518 (e.g., water or air). The chamber 504 also comprises an actuation device 520. The actuation device 520 may comprise, for example, an electroactive polymer (e.g., a piezoelectric material). In some embodiments, the actuation device 520 is configured to receive a haptic signal and responsively deform in shape.

For example, in some embodiments, the longitudinal ends of the actuation device 520 are coupled to the bottom wall 510 (and/or the side walls) of the enclosure 506. The actuation device 520 may be configured to longitudinally expand in response to a haptic signal. The longitudinal expansion of the actuation device 520 may generate stress within the actuation device 520, e.g., because the longitudinal ends of the actuation device 520 may be fixed to the bottom wall 510 of the enclosure 506. This may cause the actuation device 520 to bend upward (e.g., away from the bottom wall 510 of the enclosure 506), e.g., as shown by dashed lines 516, or otherwise deform. The deformation of the actuation device 520 may push the substance 518 away from the bottom wall 510 of the enclosure 506 and against the flexible layer 512. This may apply outward pressure to the flexible layer 512. In some embodiments, the outward pressure causes the flexible layer 512 to bend outward, e.g., as shown by dashed lines 514, or otherwise deform. In some embodiments, the deformation of the flexible layer 512 mimics the deformation in the actuation device 520. For example, if the actuation device 520 deforms into a wavy shape, the substance 518 may apply pressure against the flexible layer 512 such that the flexible layer 512 deforms into a substantially similar wavy shape. A user may interact with the deformed flexible layer 512 and perceive, e.g., a bumpy texture, wavy texture, or another haptic effect.

In some embodiments, the actuation device 520 is configured to return to a substantially planar shape (e.g., as shown in FIG. 5) in response to another haptic signal or removal of the haptic signal. As the actuation device 520 returns to the substantially planar shape, the substance 518 may apply less pressure to the flexible layer 512. This may allow the flexible layer 512 to, e.g., return to a default planar shape (e.g., as shown in FIG. 5). A user may interact with the flexible layer 512 and perceive, e.g., a smooth texture or another haptic effect.

Figure 6A:
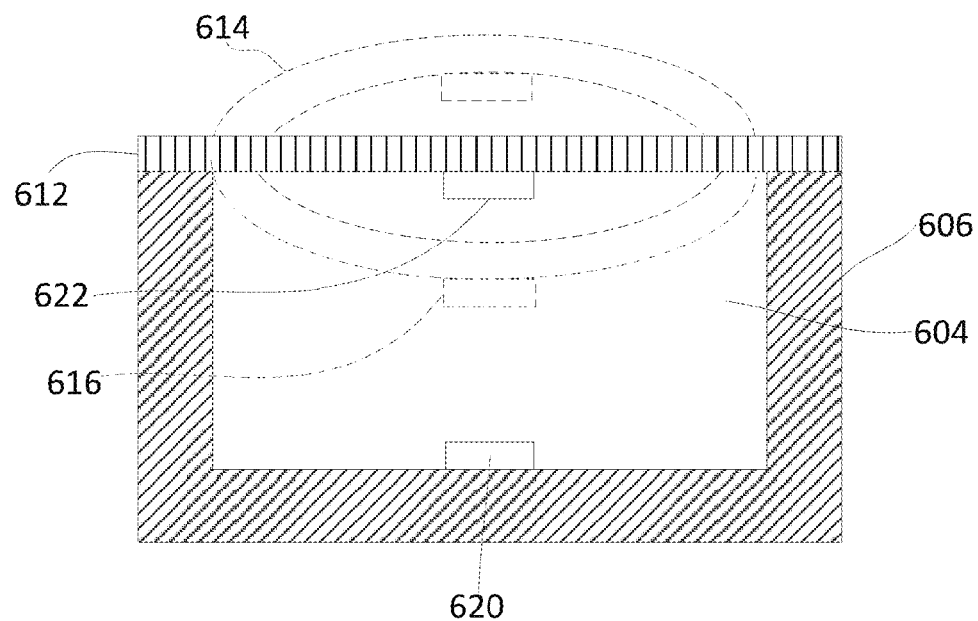
FIG. 6A shows still another embodiment of a system for haptic surface elements.

FIG. 6A shows still another embodiment of a system for haptic surface elements. The system includes haptic cell comprising an enclosure 606, a chamber 604, and a flexible layer 612 configured substantially similar to the enclosure 406, chamber 404, and flexible layer 414, respectively, of FIG. 4. The components shown in FIGS. 6A-B can be formed using any of the methods discussed with respect to FIG. 4.

In the embodiment shown in FIG. 6A, the system comprises at least two actuation devices 620, 622. One actuation device 622 may be coupled to the flexible layer 612 (e.g., a bottom of the flexible layer 612 internal to the chamber 604) and the other actuation device 620 may be positioned elsewhere in the system. For example, in some embodiments, one actuation device 622 may be positioned on a bottom side of the flexible layer 612 (e.g., as shown in FIG. 6) and the other actuation device 620 may be positioned on an inner wall of the enclosure 606. In some embodiments, the flexible layer 612 comprises an actuation device 622. For example, the actuation device 622 may comprise magnetic particles disposed within the flexible layer 612. The system can include any number of actuation devices 620, 622 in any suitable configuration.

The actuation devices 620, 622 may be configured to attract or repel one another. For example, the actuation device 620 may comprise a magnet, a ferromagnetic material, or a metal component and the actuation device 622 may comprise an electromagnet. As another example, the actuation device 622 may comprise a magnet, a ferromagnetic material, or a metal component and the actuation device 620 may comprise an electromagnet. As still another example, both actuation devices 620, 622 may comprise electromagnets. In some embodiments, a computing device may transmit a haptic signal to the electromagnet(s) configured to cause the electromagnet(s) to generate a magnetic field with a particular polarity. The magnetic field may cause actuation devices 620, 622 to attract or repel one another. These attraction and repulsion forces may cause the flexible layer 612 to bend inwards (e.g., as shown by dashed lines 616), bend outwards (e.g., as shown by dashed lines 614), or otherwise deform.

In some embodiments, one or both of the actuation devices 620, 622 comprise conductive electrodes. The conductive electrode may be formed onto a surface associated with the actuation devices 620, 622 using, for example, sputtering and vapor deposition (e.g., chemical or physical deposition). For example, an actuation device 622 comprising a conductive electrode can be formed onto the flexible layer 612 via vapor deposition. In some embodiments, a computing device may transmit a haptic signal to the conductive electrode(s) configured to cause the conductive electrode(s) to generate an electrostatic field with a particular polarity. The electrostatic field may cause actuation devices 620, 622 to attract or repel one another. These attraction and repulsion forces may cause the flexible layer 612 to bend inwards (e.g., as shown by dashed lines 616), bend outwards (e.g., as shown by dashed lines 614), or otherwise deform.

In some embodiments, the computing device may repeatedly switch the polarity of the magnetic field(s) and/or electrostatic field(s) generated by one or more of the actuation devices 620, 622. This may cause the actuation devices 620, 622 to repeatedly be attracted to and repelled from one another. The cyclic attraction and repulsion of the actuation devices 620, 622 can move the flexible layer 612 in an up-and-down motion. The up-and-down may generate, for example, a vibration or another haptic effect.

Figure 6B:
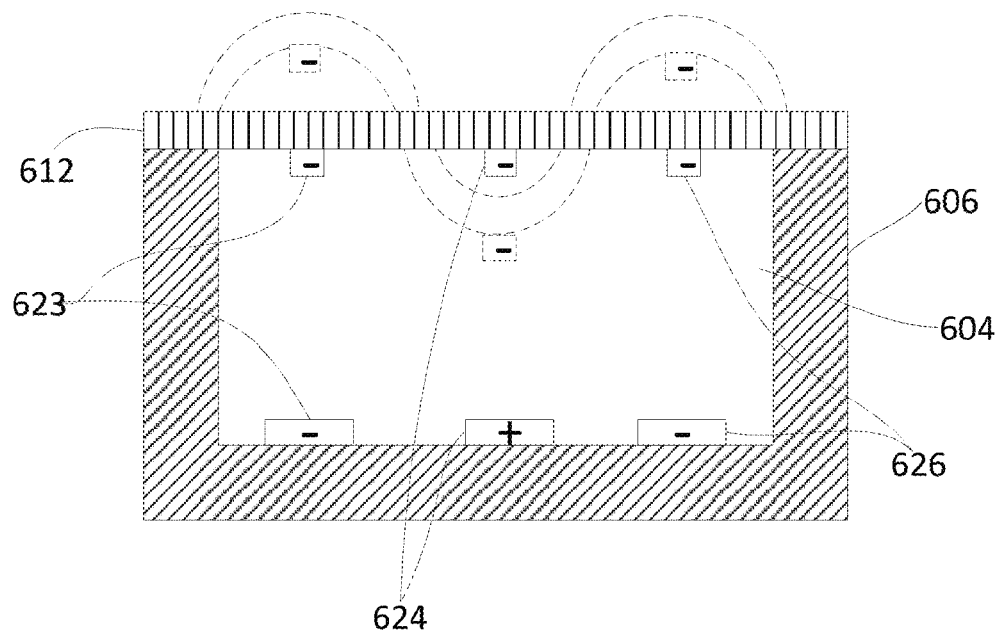
FIG. 6B shows yet another embodiment of a system for haptic surface elements.

In some embodiments, a plurality of actuation devices 622 are coupled to the flexible layer 612 (e.g., as shown in FIG. 6B). One or more additional actuation devices 620 may be positioned for applying one or more magnetic fields and/or electrical fields to the plurality of actuation devices 622. A computing device may selectively actuate one or more pairs of actuation devices 620, 622 to generate a haptic effect.

For example, as shown in FIG. 6B, a computing device may actuate pairs of actuation devices 623, 624, 626 to cause the flexible layer 612 to deform into various shapes. In some embodiments, a computing device may actuate a first pair of actuation devices 623 such that the first pair of actuation devices 623 generate magnetic fields with the same (e.g., negative) polarity. This may cause the first pair of actuation devices 623 to repel one another. The computing device may additionally or alternatively actuate a second pair of actuation devices 624 such that the second pair of actuation devices 624 generates magnetic fields with opposite polarities. This may cause the second pair of actuation devices 624 to attract one another. The computing device may additionally or alternatively actuate a third pair of actuation devices 626 such that the third pair of actuation devices 626 generates magnetic fields with the same polarity. This may cause the third pair of actuation devices 626 to repel one another. The attraction and repulsion of the pairs of actuation devices 623, 624, 626 may deform the flexible layer 612 into a shape, for example, a wavy shape (e.g., as shown by the dashed lines). A user may interact with the flexible layer 612 and perceive a haptic effect comprising, e.g., a wavy texture. The computing device may actuate any number or configuration of pairs of actuation devices 623, 624, 626 to generate haptic effects.

Figure 7A:
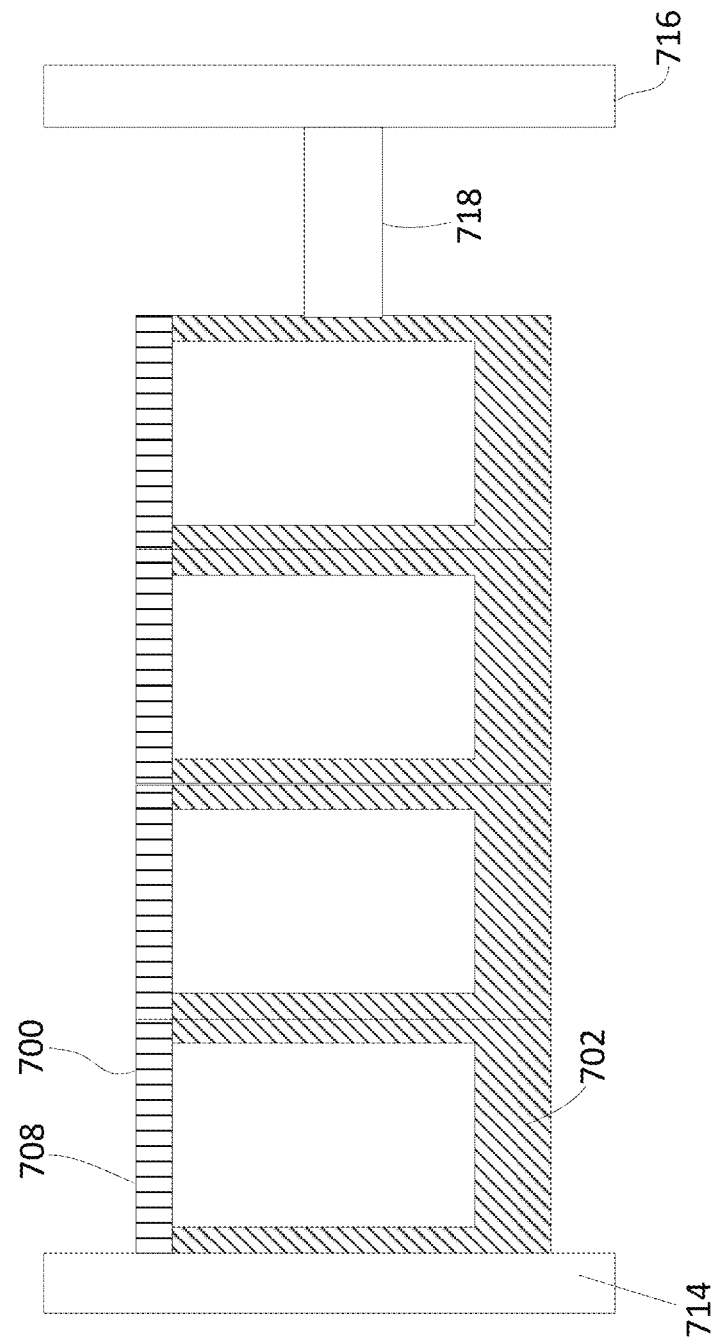
FIG. 7A shows an embodiment of a system for haptic surface elements.

FIG. 7A shows an embodiment of a system for haptic surface elements. In some embodiments, the system comprises a plurality of haptic cells 700. The plurality of haptic cells 700 can be coupled to one another. For example, each haptic cell 700 may be coupled on at least one side to an adjacent haptic cell 700. In other embodiments, the system comprises a single haptic cell 700. Although FIG. 7A depicts the plurality of haptic cells 700 comprising substantially the same shape, in other embodiments, two or more of the haptic cells 700 may comprise different shapes, volumes, sizes, and/or other characteristics.

In some embodiments, the one or more haptic cells 700 comprise an enclosure 702, a chamber, and a flexible layer 708 configured substantially similar to the enclosure 406, chamber 404, and flexible layer 414, respectively, of FIG. 4. The components shown in FIGS. 7A-B can be formed using any of the methods discussed with respect to FIG. 4.

The system may comprise a first wall 714. The first wall 714 may comprise, for example, a housing of a computing device and/or a component of the computing device. The first wall 714 may be in a fixed position with respect to the haptic cell(s) 700. At least one haptic cell 700 may be coupled to the first wall 714.

The system may comprise a second wall 716. The second wall 716 may comprise, for example, a housing of a computing device and/or a component of the computing device. The second wall 716 may be in a fixed position with respect to the haptic cell(s) 700. At least one haptic cell 700 may be coupled to the second wall 716 via an actuation device 718.

Figure 7B:
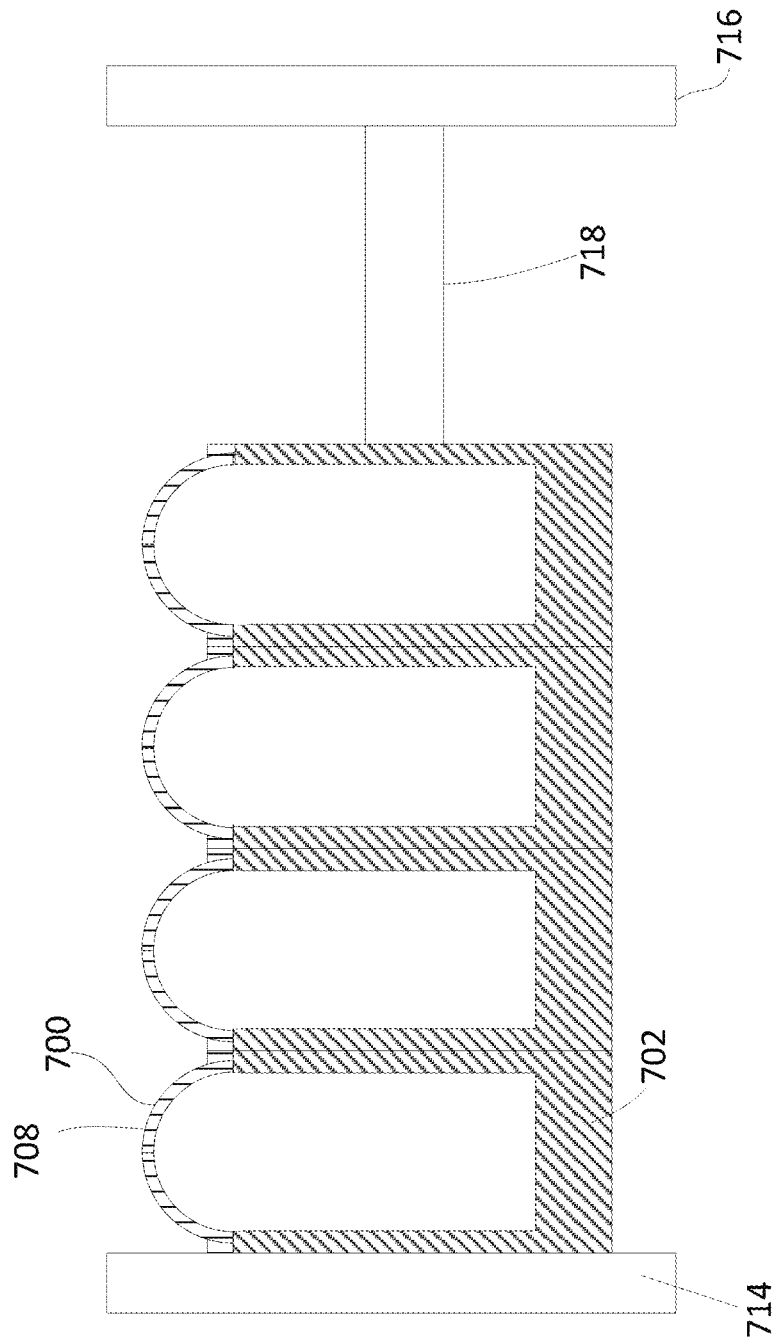
FIG. 7B shows another embodiment of a system for haptic surface elements.

In some embodiments, the actuation device 718 comprises a material configured to expand and/or contract (e.g., longitudinally expand or contract) in response to a haptic signal. For example, the actuation device 718 may comprise a piezoelectric material. A computing device may transmit a haptic signal to the actuation device 718 configured to cause the actuation device 718 to longitudinally expand, for example, as shown in FIG. 7B. The expanding actuation device 718 may cause the one or more haptic cells 700 to laterally compress against each other and/or the first wall 714. This may cause the flexible layer 708 of a haptic cell 700 to buckle upwards (e.g., as shown in FIG. 7B) and/or downwards, e.g., because the sides of the flexible layer 708 may be affixed to an associated enclosure 702 and the middle of the flexible layer 708 may be free to move. A user may interact with the flexible surface(s) 708 of the haptic cell(s) 700 and perceive one or more haptic effects, such as a bumpy texture.

In some embodiments, the computing device may transmit another haptic signal to, or remove the haptic signal from, the actuation device 718. This may cause the actuation device 718 to laterally compress. The lateral compression of the actuation device 718 may allow the haptic cell(s) 700 to laterally expand and/or change to a default shape (e.g., as shown in FIG. 7A). This may cause a flexible layer 708 of a haptic cell 700 to return to a substantially planar shape and/or otherwise deform. A user may interact with the flexible surface(s) 708 of the haptic cell(s) 700 and perceive one or more haptic effects, such as a smooth texture.

Figure 8:
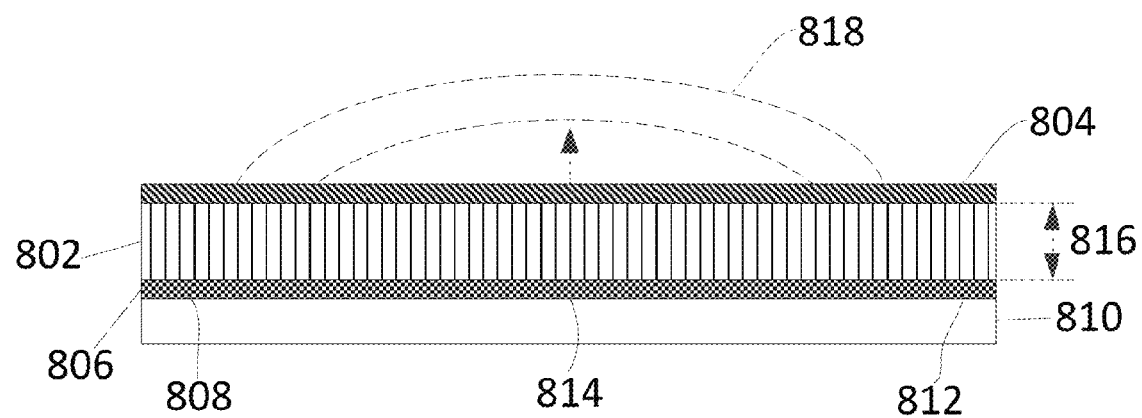
FIG. 8 shows still another embodiment of a system for haptic surface elements.

FIG. 8 shows still another embodiment of a system for haptic surface elements. The system includes a haptic cell comprising a flexible layer 802. The flexible layer 802 may comprise a dielectric elastomer. An upper flexible electrode 804 may be coupled to an upper surface of the flexible layer 802. A lower flexible electrode 806 may be coupled to a lower surface of the flexible layer 802.

At least one of the lateral ends 808, 812 of the lower flexible electrode 806 may be coupled to a surface 810 (e.g., a housing of a computing device). In some embodiments, both ends 808, 812 of the lower flexible electrode 806 are coupled to the surface 810. A middle portion 814 between the lateral ends 808, 812 of the lower flexible electrode 806 may not be coupled to the surface 810. This may allow the lateral center of the haptic cell to move (e.g., upward away from the surface 810, as shown by a dashed arrow).

In some embodiments, a computing device may apply voltage across the upper flexible electrode 804 and the lower flexible electrode 806 to actuate the haptic cell. This may generate an electrostatic force that compresses the thickness 816 of the flexible layer. The compression may cause the flexible layer 802 to longitudinally expand. In some embodiments, the longitudinal expansion of the flexible layer 802 may generate stress within the flexible layer 802, e.g., because the ends 808, 812 of the lower flexible electrode 806 (to which the flexible layer 802 is coupled) may be affixed to the surface 810. The stress may cause the flexible layer 802 to bend (e.g., away from the surface 810, as shown by dashed lines 818) and/or otherwise deform.

Illustrative Applications of Haptic Surface Elements

Figure 9A:
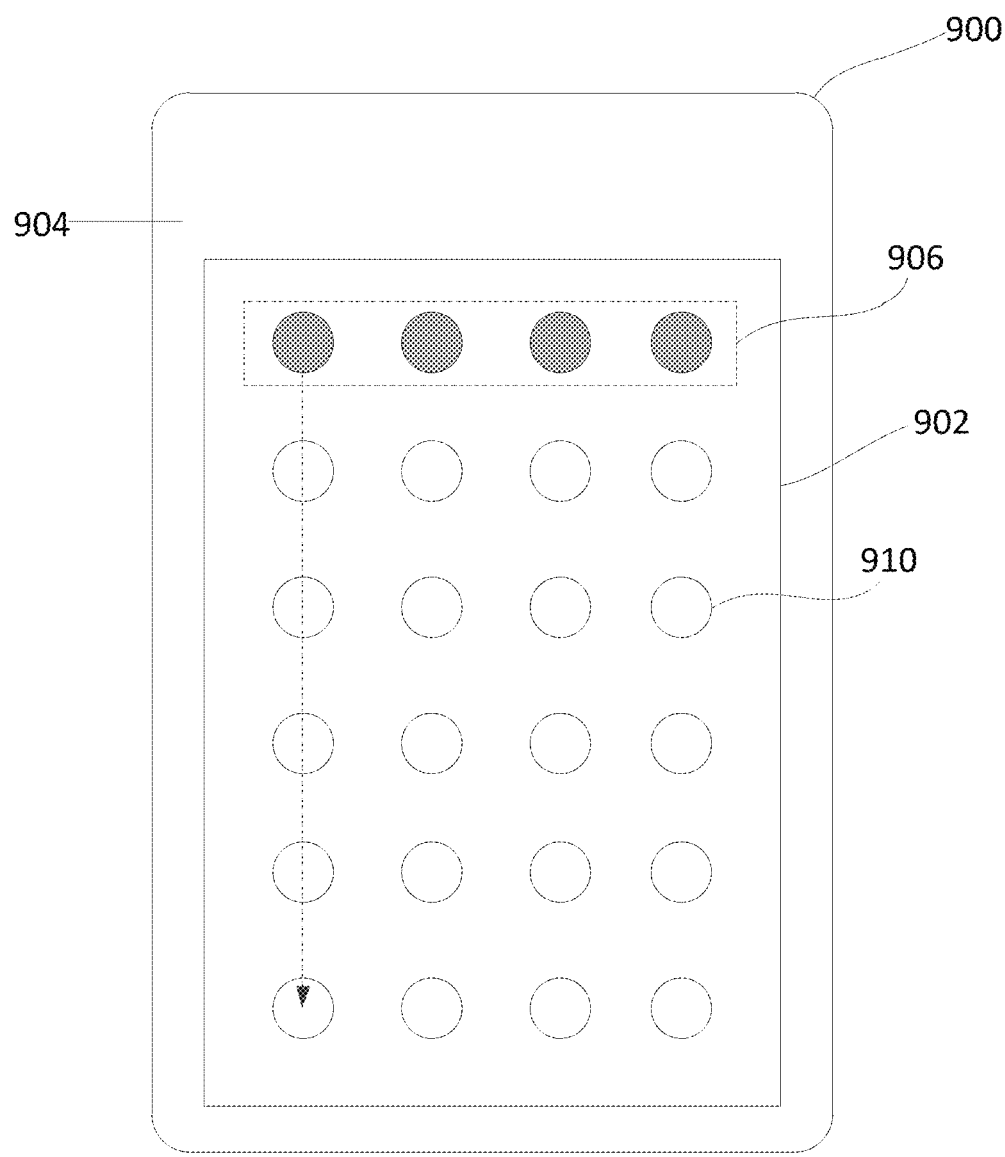
FIG. 9A shows yet another embodiment of a system for haptic surface elements.
Figure 9B:
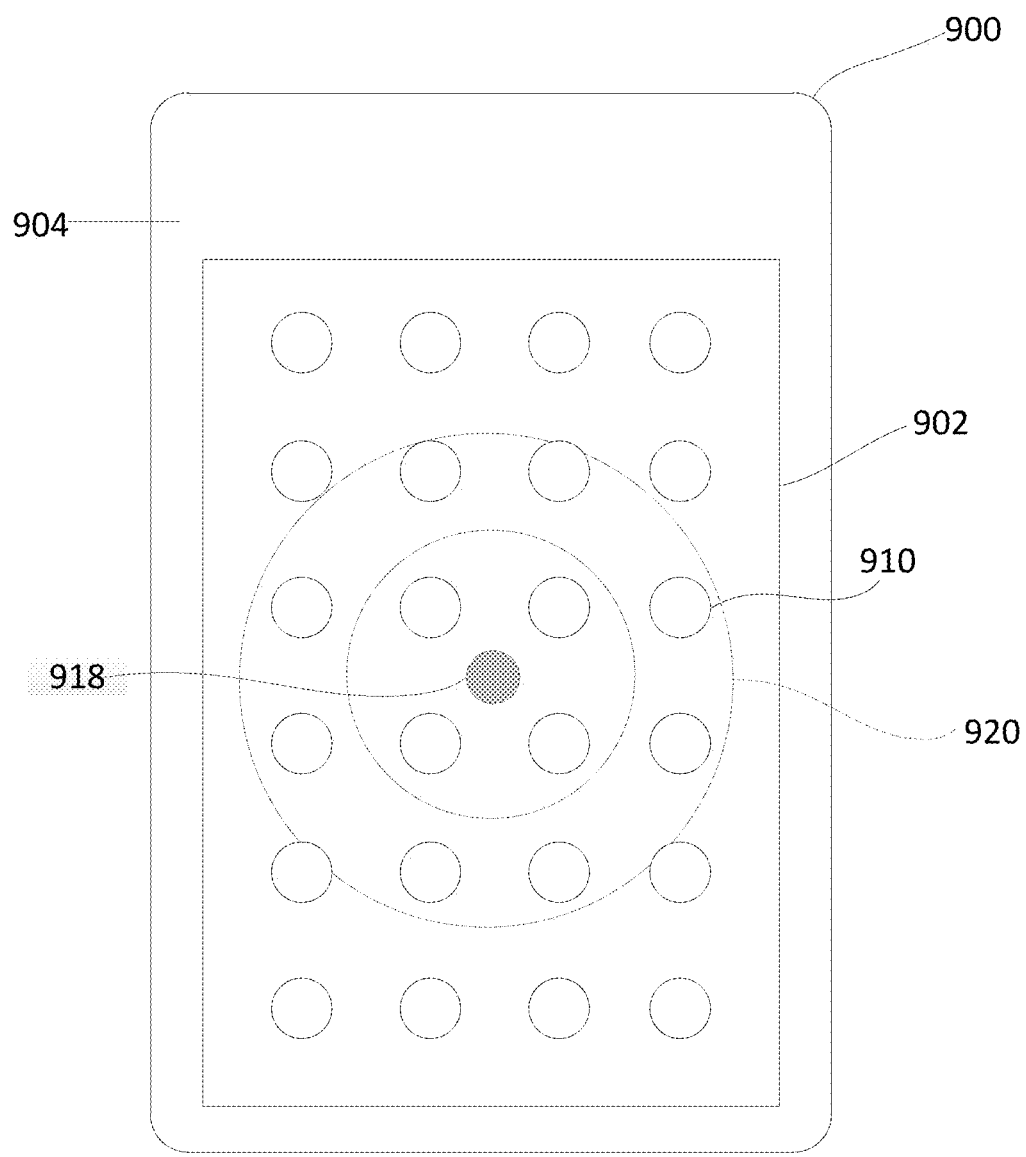
FIG. 9B shows an embodiment of a system for haptic surface elements.
Figure 9C:
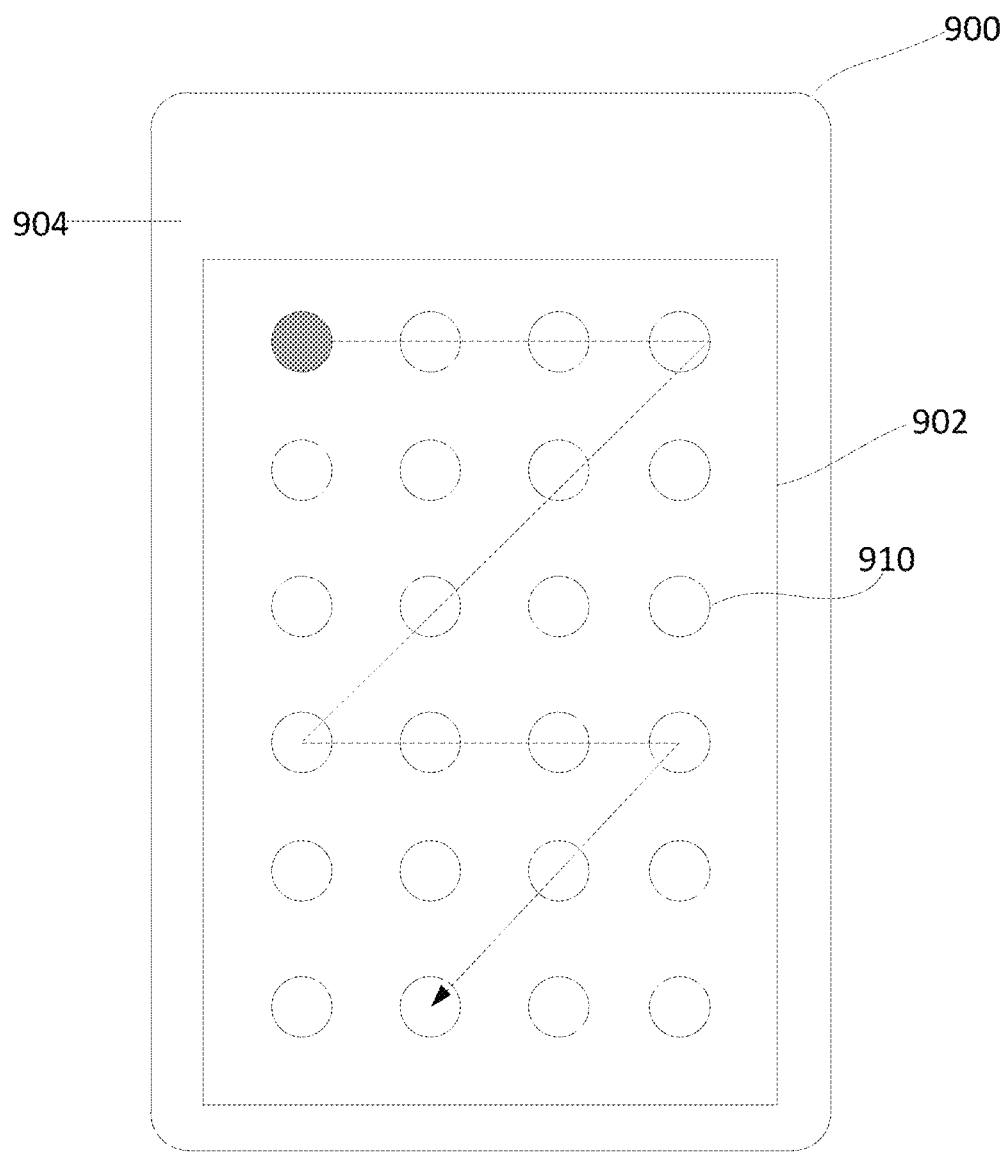
FIG. 9C shows another embodiment of a system for haptic surface elements.

A variety of computing devices may make use of embodiments of the present disclosure to provide compelling haptic feedback to users of those computing devices. FIGS. 9A-C illustrate various implementations of haptic surface elements for providing haptic feedback. Referring to FIG. 9A, FIG. 9A shows a computing device 900 comprising a haptic output device 902, e.g., positioned on the back 904 of the computing device 900.

In some embodiments, the computing device 900 is configured to output dynamic and/or changing haptic effects. For example, the computing device 900 may be executing a surfing video game. As a virtual wave moves across a display (e.g., positioned on the front of the computing device 900), the computing device 900 may output an associated dynamic haptic effect. In some embodiments, the dynamic haptic effect may comprise a moving texture configured to, e.g., simulate the wave. For example, the computing device 900 may sequentially actuate rows 906 of haptic cells 910, e.g., in the direction of the dashed arrow. A user contacting the haptic output device 902 may perceive the sequential actuation of the rows 906 of haptic cells 910 as, e.g., a wave haptic effect. The computing device 900 can actuate any number or arrangement of haptic cells 910 in sequence and/or in concert to generate haptic effects. The actuated haptic cells 910 can be adjacent or non-adjacent to one another.

In some embodiments, computing device 900 is configured to output dynamic and/or changing haptic effects configured to provide directional and/or spatial cues to a user. For example, in the embodiment shown in FIG. 9B, the haptic output device 902 is overlaying a touch-screen display. The computing device 900 may execute a video game in which a user has dropped a virtual rock 918 into virtual water, generating virtual ripples 920. In some embodiments, the computing device 900 is configured to actuate the haptic cells 910 to simulate the outward ripple from the drop location of the virtual rock 918. For example, as the virtual ripples 920 propagate outwardly from the drop location on the display, the computing device 900 may cause haptic cells 910 that are closer to the drop location to provide stronger haptic effects, and haptic cells 910 that are progressively farther to the drop location to provide progressively weaker haptic effects. A user contacting the haptic output device 902 at various locations may be able to sense, e.g., the directionality, magnitude, and other features of the virtual ripples 920 at the various locations.

In some embodiments, the computing device 900 is configured to output a confirmatory haptic effect. The haptic effect may confirm to a user that, e.g., the computing device 900 detected a user input. For example, the computing device 900 may detect a user interaction with a virtual button output as part of a graphical user interface (GUI) on, e.g., a touch-screen display. In some embodiments, the computing device 900 responsively outputs a haptic effect configured to confirm that the computing device 900 detected the user interaction. In such an embodiment, the haptic effect may comprise a dynamic haptic effect. For example, the haptic effect may comprise a sequential actuation of haptic cells 910 (e.g., in the zig-zag pattern shown by the dashed lines in FIG. 9C) along the haptic output device 902.

In some embodiments, the computing device 900 is configured to output a haptic effect configured to perform a particular function (e.g., improve or diminish a user's grip, counteract forces applied to the computing device 900, etc.). For example, the computing device 900 may determine that a user is shaking the computing device 900 based on a sensor signal from a sensor (e.g., an accelerometer). The computing device 900 may responsively output a haptic effect configured to, e.g., provide better grip to the user. For example, the computing device 900 may output a haptic effect comprising a bumpy texture configured to, e.g., enhance the user's grip on the computing device 900. As another example, the computing device 900 may determine that the computing device 900 is wet and/or slippery, e.g., based on a sensor signal from a sensor (e.g., a fluid sensor or moisture sensor). The computing device 900 may responsively output a haptic effect configured to, e.g., improve the user's grip.

Figure 9D:
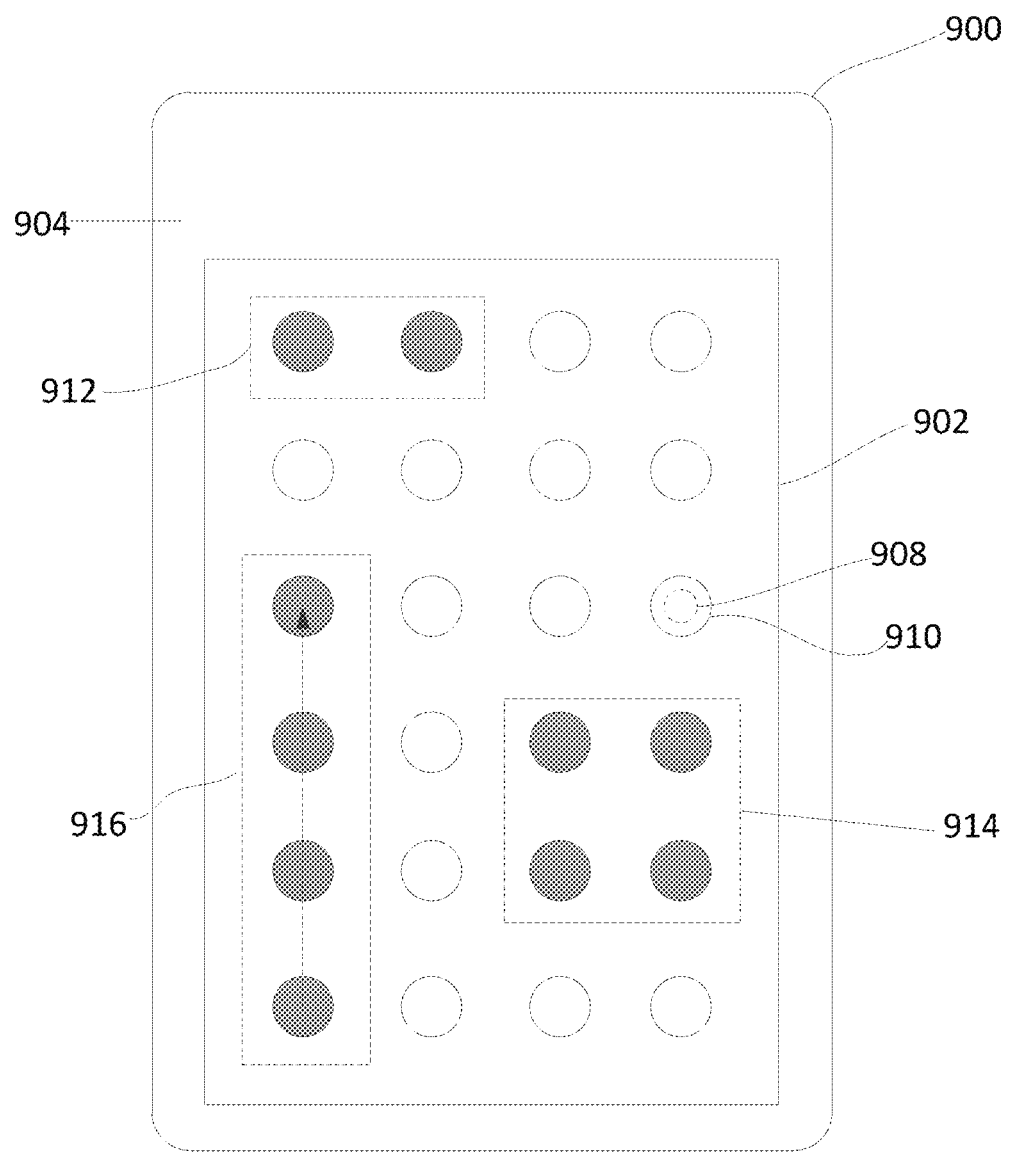
FIG. 9D shows yet another embodiment of a system for haptic surface elements.

Referring now to FIG. 9D, in some embodiments, the computing device 900 actuates one or more haptic cells 910 of the haptic output device 902 to generate a user interface. For example, the computing device 900 may actuate one or more haptic cells 910 to delineate the locations of buttons 912, 914, sliders 916, and/or other user interface components with which a user can interact. The computing device 900 can actuate any number or configuration of haptic cells 910 to generate a user interface component.

In some embodiments, the haptic output device 902 may comprise or otherwise be coupled to a sensor 908, such as a touch sensor (e.g., a capacitive touch-sensor positioned beneath the haptic output device 902), configured to detect a user interaction with a user interface component. For example, the sensor 908 may comprise a photoresistor or a material (e.g., a smart material) configured to respond to a change in ambient light by outputting an electrical signal associated with the change in ambient light. A user may interact with (e.g., slide a finger across) the haptic output device 902 to, e.g., perceive the locations, types, and/or other characteristics of the user interface components and/or to provide input to the computing device 900. The sensor 908 can detect the user interaction and transmit sensor signals (e.g., comprising the pressure, location, direction, etc.) associated with the user interaction to the computing device 900. For example, the sensor 908 may transmit a sensor signal associated with a change in ambient light in response to an object, such as a user's finger, being positioned over the haptic cell 910 (e.g., and thereby blocking a portion of the ambient light from reaching the sensor). The computing device 900 may receive the sensor signal and determine a user input based on the sensor signal.

In some embodiments, the computing device 900 detects a user interaction with the computing device 900 based on a movement of a fluid within the haptic output device 902 (e.g., a haptic cell 910 of the haptic output device 902). For example, a user may rotate or apply pressure to the computing device 900 to provide input to the computing device 900. This may cause a fluid contained within a haptic output device 902 to move. The computing device 900 may detect and/or identify the user input based on a sensor signal from a sensor 908 configured to, e.g., detect the movement of the fluid.

In some embodiments, the haptic cell 910 may be used to both detect user input and provide a haptic effect. For example, in an embodiment in which the sensor 908 comprises a smart material, the smart material may generate one or more sensor signals associated with a user input in response to a stimulus (e.g., a user's finger being positioned over the haptic cell 910 and blocking ambient light to the sensor 908). The computing device 900 may receive the sensor signals and determine a user input based on the sensor signals. Further, the computing device 900 may actuate the smart material using the same stimulus or a different stimulus to output a haptic effect. For example, the computing device 900 may apply a voltage to the smart material to cause the smart material to deform in shape. The deformation in shape may be perceivable as a haptic effect to a user. Thus, in such an embodiment, the haptic cell 910 may be able to receive input and provide output.

In some embodiments, the computing device 900 outputs, or modifies a characteristic of a haptic effect based on a sensor signal from a sensor 908. For example, the computing device 900 may actuate haptic cell 910 to, e.g., form a raised bump (or another raised shape) defining a portion of a user interface component, such as a button. A user may apply an amount of force (e.g., pressure) to the haptic cell 910, e.g., to provide input via the user interface component. The sensor 908 may detect the amount of force applied to the haptic cell 910 and transmit a sensor signal associated with the amount of force. The computing device 900 may receive the sensor signal and, in response to the sensor signal, output a haptic effect (e.g., a vibration). The haptic effect may, for example, confirm to the user that the input was received. The computing device 900 may additionally or alternatively actuate the haptic cell 910 to cause the haptic cell 910 to deform into another shape, such as a flat shape, a concave shape, or smaller bump. This deformation may, e.g., indicate to the user that the user has already interacted with the haptic cell 910.

In some embodiments, the computing device 900 is configured to output a haptic effect associated with an amount of force detected by the sensor 908. For example, the computing device 900 may actuate a plurality of haptic cells 910 to define a user interface component, such as a button. A user may apply differing amounts of force to the haptic cells 910, e.g., to interact with the user interface component. In response to a first amount of force (e.g., a light press) being applied by the user, the computing device 900 may actuate the haptic cells 910 to cause the haptic cells 910 to, e.g., push back against the user. This may simulate a spring force of a button. In response to a second amount of force (e.g., a firm press) being applied by the user, the computing device 900 may output, e.g., a vibration and/or cause the haptic cells 910 to change to a flat (e.g., planar) shape. This may simulate a button click. In some embodiments, the combination of haptic effects may more realistically simulate interacting with a real button.

In some embodiments, the computing device 900 performs one or more functions (e.g., dials a phone number; inputs text; sends a text message; causes the computing device 900 to enter a particular mode, such as a sleep mode or an awake mode; executes an application, such as a sound recording application; etc.) in response to a user interaction with a user interface component (and/or based on a sensor signal from sensor 908). For example, the computing device 900 may actuate groups of haptic cells 910 to delineate the locations of buttons 912, 914 with which a user can interact to provide input, e.g., a security code. In some embodiments, the computing device 900 may detect a sequence of user interactions with the buttons 912, 914 and determine if the sequence matches a predefined sequence (e.g., stored in memory). If so, the computing device 900 may perform an associated function such as, for example, unlocking the computing device 900 and/or waking the computing device 900 from a sleep mode.

As another example, in some embodiments, the computing device 900 may actuate a group of haptic cells 910 to define the location of a slider 916 with which a user can interact to provide input. The computing device 900 may detect a user sliding a finger (e.g., upwards, as shown by the dashed arrow) along the haptic cells 910 of the slider 916 and responsively perform an associated function. For example, the computing device 900 may responsively modify (e.g., increase or decrease) the volume in a music application executing on the computing device 900.

In some embodiments, the computing device 900 may perform one or more functions based on an amount of force (e.g., as detected by sensor 908) that is associated with a user interaction. For example, the computing device 900 may execute a camera application. The computing device 900 may actuate haptic cells 910 to delineate the location of a button 912 associated with the camera application. In some embodiments, the computing device 900 may detect (e.g., via a sensor associated with a haptic cell defining the button 912) a light press against the button 912. In response to the light press, the computing device 900 may focus a camera of the computing device 900. The computing device 900 may also output a haptic effect configured to, e.g., simulate a shutter focusing. In some embodiments, the computing device 900 may detect a firm press against the button 912. In response to the firm press, the computing device 900 may take a photo (or video) using the camera. The computing device 900 may also output a haptic effect configured to, e.g., simulate a shutter click.

As another example, in some embodiments, the computing device 900 may output a graphical user interface via a display. The haptic output device 902 may be positioned overtop of the display. In some embodiments, the computing device 900 may actuate haptic cells 910 to form shapes associated with icons output in the graphical user interface. For example, the computing device 900 may actuate haptic cells 910 positioned overtop of a particular icon to define a boundary or other characteristic of the icon. In some embodiments, the computing device 900 may detect a light press against the haptic cells 910. In response to the light press, the computing device 900 may output, via the display, information associated with an application associated with the icon. For example, if the icon is associated with a drawing application, the computing device 900 may output information about the drawing application, a thumbnail-sized view of a recently saved drawing, or other information. In some embodiments, the computing device 900 may detect a firm press against the haptic cells. In response to the firm press, the computing device 900 may launch the application. Thus, a user may interact with the haptic cells 910 using different amounts of force to cause the computing device 900 to perform different functions associated with the application.

In some embodiments, user interfaces that are at least partially defined by one or more haptic cells 910 may allow the user to interact with computing device 900 without visually concentrating on the computing device 900. For example, the user may be able to leave the computing device 900 in the user's pocket and/or position the computing device 900 out of view of an onlooker while providing input to the computing device 900.

In some embodiments, the haptic output device 902 is physically separated from the computing device 900 (e.g., the haptic output device 902 may be a peripheral device usable with the computing device 900). For example, the haptic output device 902 may be remote from, and in wired or wireless communication with, the computing device 900. The computing device 900 may receive input from, and provide output to, a user via the haptic output device 902. For example, the haptic output device 902 may detect a user interaction (e.g., using any of the methods described above) and transmit a signal associated with the user interaction to the computing device 900. The computing device 900 may receive the signal and responsively transmit a haptic signal to the haptic output device 902. The haptic signal may cause the haptic output device 902 to, e.g. generate one or more haptic effects and/or modify a user interface.

Illustrative Methods for Haptic Surface Elements

Figure 10:
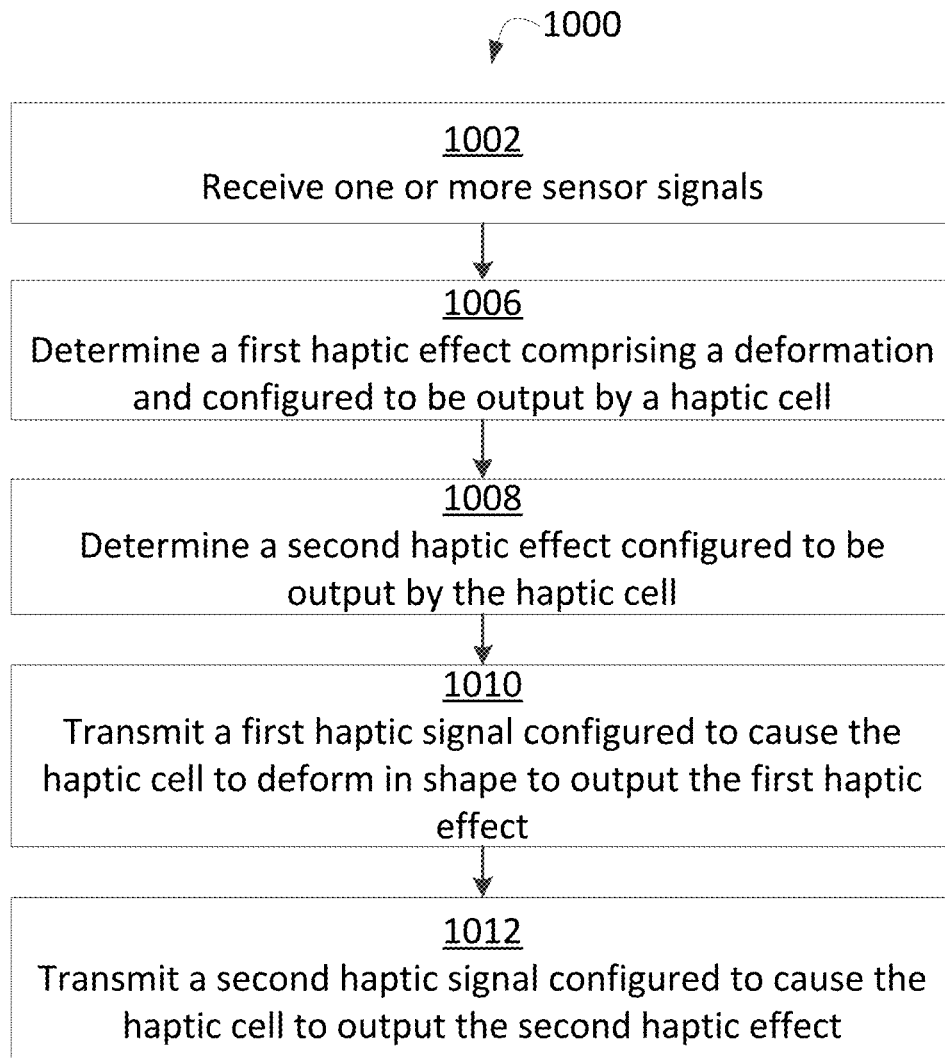
FIG. 10 is a flow chart of steps for performing a method for providing haptic surface elements according to one embodiment.

FIG. 10 is a flow chart of steps for performing a method for providing haptic surface elements according to one embodiment. In some embodiments, the steps in FIG. 10 may be implemented in program code that is executed by a processor, for example, the processor in a general purpose computer, a mobile device, or a server. In some embodiments, these steps may be implemented by a group of processors. In some embodiments one or more steps shown in FIG. 10 may be omitted or performed in a different order. Similarly, in some embodiments, additional steps not shown in FIG. 10 may also be performed. The steps below are described with reference to components described above with regard to computing device 301 shown in FIG. 3.

The method 1000 begins at step 1002 when the processor 302 receives one or more sensor signals. The processor 302 may receive the sensor signal from, for example, a sensor 330, a touch sensor 308, etc. For example, in response to an event (e.g., the user shaking the computing device 301), the sensor 330 (e.g., an accelerometer and/or gyroscope) may transmit a sensor signal associated with the event to the processor 302 (e.g., the speed and direction of the shake). As another example, in response to a user interacting with a surface of the haptic output device 318, a touch sensor 308 associated with the haptic output device 318 may detect the user interaction and transmit an associated sensor signal to the processor 302.

In some embodiments, the processor 302 receives the sensor signal from the I/O components 312. In such an embodiment, the sensor signal may be associated with a user interaction with a user interface device (e.g., a button, switch, lever, knob, and/or touch sensitive surface 316) associated with the computing device 301. For example, upon a user interacting with (e.g., tapping, gesturing along, etc.) the touch sensitive surface 316, the processor 302 may receive a signal from the touch sensor 308 via the I/O components 312.

The method 1000 continues at step 1006 when the processor 302 determines a first haptic effect comprising a deformation. The first haptic effect is configured to be output, at least in part, by a haptic cell of the haptic output device 318.

In some embodiments, the processor 302 determines the first haptic effect based at least in part on a sensor signal. For example, the processor 302 may access a lookup table stored in memory 304 to map one or more characteristics of the sensor signal (e.g., the magnitude, duration, frequency, waveform, and/or data carried by the sensor signal) to one or more haptic effects. As another example, the processor 302 may apply data from the sensor signal to one or more algorithms determine one or more associated haptic effects. As still another example, the processor 302 may determine a user input (e.g., a type of user input, such as a tap, a two-finger pinch, and/or a swipe along the surface of the touch sensitive surface 316) based on the sensor signal. The processor 302 may access a lookup table stored in memory 304 to map one or more user inputs to one or more haptic effects.

In some embodiments, the processor 302 may determine the first haptic effect based on multiple sensor signals from sensor(s) 330. For example, a user may be driving a vehicle at night. The processor 302 may receive a first sensor signal from an ambient light detector. The first sensor signal may indicate a low amount of ambient light (e.g., because it is nighttime). The processor 302 may receive a second sensor signal from an accelerometer. The second sensor signal may indicate a high rate of speed (e.g., because the user is driving the vehicle). The processor 302 may receive a third sensor signal from a microphone. The third sensor signal may be associated with environmental noises (e.g., an engine sound, a car honk, and/or rushing wind). In some embodiments, the processor 302 may determine that the computing device 301 is located in a moving vehicle based on two or more of the sensor signals. Additionally or alternatively, the processor 302 may determine a first haptic effect comprising a bumpy texture configured to, e.g., make it easier for the user to locate, identify, and/or grasp the computing device 301 in the low-light, fast-moving environment of the vehicle.

As another example, a user may have placed the computing device 100 in the user's pocket or purse. The processor 302 may receive a first sensor signal from an ambient light detector indicating a low amount of ambient light (e.g., because the computing device 100 is in the user's pocket or purse). The processor 302 may receive a second sensor signal from a gyroscope indicating that the computing device 100 is upside down or at another irregular angle. In some embodiments, the processor 302 may determine that the computing device 301 is located in a bag or another receptacle based on the sensor signals. Additionally or alternatively, the processor 302 may determine a first haptic effect configured to, e.g., simplify locating, identifying, and/or grasping the computing device 301 from the receptacle.

In some embodiments, the processor 302 determines a first haptic effect based at least in part on an event. An event, as used herein, is any interaction, action, collision, or other event which occurs during operation of the computing device 301 which can potentially comprise an associated haptic effect. In some embodiments, an event may comprise user input or user interaction (e.g., a button press, manipulating a joystick, interacting with a touch-sensitive surface, tilting or orienting the computing device 100), a system status (e.g., low battery, low memory, or a system notification, such as a notification generated based on the system receiving an incoming call), sending data (e.g., sending an e-mail), receiving data (e.g., receiving a text message), performing a function using the computing device 301 (e.g., placing or receiving a phone call), or a program event (e.g., if the program is a game, a program event may comprise explosions, gunshots, collisions, interactions between game characters, advancing to a new level, or driving over bumpy terrain).

For example, the processor 302 may access a lookup table stored in memory 304 to map an event to one or more haptic effects. For example, the processor 302 may map an event comprising an incoming e-mail to a haptic effect comprising a texture having raised bumps arranged in the shape of an e-mail icon. As another example, the processor 302 may apply data associated with the event (e.g., the time the event occurred, a priority of the event, a numerical value associated with the event, etc.) to one or more algorithms to determine one or more associated haptic effects or a characteristic of a haptic effect. For instance, the processor 302 may apply one or more characteristics of a movement of a virtual object across a display screen to an algorithm to determine, e.g., one or more haptic cells to actuate to generate a dynamic haptic effect.

In some embodiments, the processor 302 determines a first haptic effect based at least in part on a characteristic associated with a virtual object. For example, the computing device 301 may output a virtual object on a display. A user may interact with the virtual object via, for example, the touch sensitive surface 316. In some embodiments, the processor 302 may responsively determine the haptic effect based on the height, width, shape, color, location, function, texture, and/or another characteristic associated with the virtual object. For example, if the virtual object comprises a boulder in a construction simulator, the processor 302 may determine a haptic effect comprising a rocky and/or bumpy texture.

In some embodiments, the processor 302 determines the haptic effect based on a characteristic of a deformation (e.g., the size, shape, and/or thickness of a raised bump) in the haptic output device 318. The deformation may be due to, e.g., a previous haptic effect. In some embodiments, the processor 302 determines the characteristic based on the amount of power transmitted to, the size of, the type of, the location of, and/or a material of the haptic output device 318 (e.g., a substance positioned within the haptic output device 318). For example, the processor 302 may estimate the amount a piezoelectric material of the haptic output device 318 expanded and/or contracted in response to a haptic signal, and associate the amount with a deformation of a particular size and/or shape. The processor 302 may cause an actuation device of the haptic output device 318 to apply any number and/or type of changes to the haptic output device 318 to achieve a desired haptic effect.

For example, in some embodiments, if the processor 302 determines that the haptic output device 318 already comprises a desired deformation, the processor 302 may determine, e.g., no haptic effect. In some embodiments, if the processor 302 determines that the haptic output device 318 has a deformation with a thickness below a threshold, the processor 302 may determine a haptic effect configured to, e.g., increase the thickness of the deformation above the threshold. In some embodiments, if the processor 302 determines that the haptic output device 318 has a deformation with a thickness above a threshold, the processor 302 may determine a haptic effect configured to, e.g., decrease the thickness of the deformation below the threshold.

In some embodiments, the processor 302 determines a plurality of haptic effects. Each of the plurality of haptic effects may be associated with a different characteristic of a virtual object and/or a user interaction (e.g., with the computing device 301). For example, the computing device 301 may output a virtual firearm on a touch-screen display. Upon the user contacting a location on the touch-screen display associated with a trigger of the firearm, the processor 302 may determine a haptic effect, e.g., associated with the texture of the trigger (e.g., a metal texture). The processor 302 may generate the haptic effect by, for example, actuating a plurality of haptic cells of a haptic output device 318 positioned, e.g., overtop of the touch sensitive surface 316. The processor 302 may also determine another haptic effect associated with, e.g., the texture of a wooden handle of the virtual firearm. In one such embodiment, the processor 302 may generate the haptic effect by, for example, actuating a different configuration of the haptic cells. In some embodiments, the multiple haptic effects may provide a more realistic and immersive representation of the virtual object (e.g., interacting with a firearm).

The method 1000 continues at step 1008 when the processor 302 determines a second haptic effect configured to be output by the haptic cell of the haptic output device 318. The processor 302 may determine the second haptic effect using any of the methods described above with respect to step 1006.

The method 1000 continues at step 1010 when a processor 302 transmits a first haptic signal configured to cause the haptic cell deform in shape to output the first haptic effect. In some embodiments, the processor 302 may access drive signals stored in memory 304 and associated with particular haptic effects to determine the first haptic signal. In one embodiment, a haptic signal is generated by accessing a stored algorithm and inputting parameters associated with an effect. For example, in such an embodiment, an algorithm may output data for use in generating a drive signal based on amplitude and frequency parameters. As another example, a haptic signal may comprise data to be decoded by the haptic output device 318. For instance, the haptic output device 318 may itself respond to commands specifying parameters such as amplitude and frequency.

In some embodiments, the processor 302 transmits the first haptic signal to an actuation device. The actuation device may be configured to cause the flexible layer of the haptic output device 318 to deform using any of the methods described in the present disclosure.

The method 1000 continues at step 1012 when the processor 302 transmits a second haptic signal configured to cause the haptic cell to output the second haptic effect. The processor 302 may determine the haptic signal using any of the methods describe above with respect to step 1010.

In some embodiments, the processor 302 may transmit the first haptic signal and the second haptic signal concurrently (e.g., substantially simultaneously) to cause the haptic cell to output the first haptic effect and the second haptic effect concurrently. A user may perceive the concurrent output of the first haptic effect and the second haptic effect as a combined haptic effect or composite haptic effect.

For example, in some embodiments, the user may be playing a video game on the computing device 301. In response to the user's virtual character in the video game contacting a sharp surface (e.g., pins, knives, or needles), the processor 302 may determine a combined haptic effect to output. The processor 302 may cause a haptic cell to output a first haptic effect and a second haptic effect to output the combined haptic effect. For example, the processor 302 may transmit a first haptic signal configured to cause a flexible layer of the haptic cell to deform into a bump shape. The processor 302 may also transmit a second haptic signal configured to output an electrotactile haptic effect comprising a stinging sensation. As the user contacts the haptic cell with a body part, the user may feel the combination of the bump shape and the stinging sensation. The user may perceive the combination of the bump shape and the stinging sensation as a combined haptic effect, e.g., simulating the sharp surface.

As another example, in the above video game embodiment, the processor 302 may determine a combined haptic effect in response to the user's character traversing a rocky terrain. The processor 302 may cause a haptic cell to output a first haptic effect and a second haptic effect to output the combined haptic effect. For example, the processor 302 may transmit a first haptic signal configured to cause a flexible layer of the haptic cell to deform into a bump shape. The processor 302 may also transmit a second haptic signal configured to further deform the flexible layer of the haptic cell into a textured surface. As the user contacts the haptic cell with a body part, the user may feel the raised, textured surface. The user may perceive the raised, textured surface as a combined haptic effect, e.g., simulating the texture and other features of rocky terrain.

In some embodiments, the haptic output device 318 comprises one or more haptic cells configured as described with respect to any one of, or combination of, FIGS. 2 and 4-8. In such an embodiment, the processor 302 may generate a haptic effect by actuating one or more of the haptic cells in sequence and/or in concert. For example, the processor 302 may actuate one or more haptic cells sequentially to generate a dynamic haptic effect, e.g., as discussed with respect to FIG. 9A. In some embodiments, the processor 302 may generate the haptic effect by actuating one or more of the haptic cells according to one or more steps of the method 1100 of FIG. 11.

Figure 11:
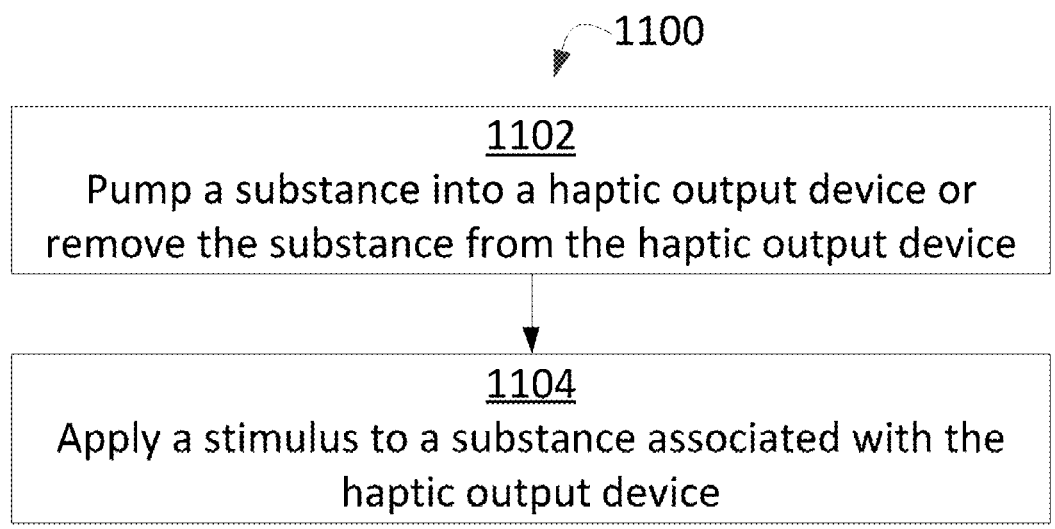
FIG. 11 is a flow chart of steps for performing a method for providing haptic surface elements according to another embodiment.

FIG. 11 is a flow chart of steps for performing a method for providing haptic surface elements according to another embodiment. In some embodiments, the steps in FIG. 11 may be implemented in program code that is executed by a processor, for example, the processor in a general purpose computer, a mobile device, or a server. In some embodiments, these steps may be implemented by a group of processors. In some embodiments one or more steps shown in FIG. 11 may be omitted or performed in a different order. Similarly, in some embodiments, additional steps not shown in FIG. 11 may also be performed. In some embodiments, one or more of the steps shown in FIG. 11 may be sub-steps within one of the steps of the method 1000 described above. The steps below are described with reference to components described above with regard to computing device 301 shown in FIG. 3.

The method 1100 begins at step 1102 when the processor 302 causes an actuation device of the haptic output device 318 to pump a substance into a haptic output device 318 (e.g., the chamber of the haptic output device 318) or remove the substance from the haptic output device 318. The substance may comprise a solid, liquid, and/or gas.

In some embodiments, the processor 302 causes the actuation device to pump the substance into the haptic output device 318 to, e.g., change the shape of and/or otherwise deform the haptic output device 318 (e.g., to generate a raised bump). For example, the processor 302 may cause the actuation device to pump the substance into the haptic output device 318 in response to a user interaction with a virtual object comprising, e.g., a sandy texture. The processor 302 may cause an amount of the substance to be pumped into the haptic output device 318 configured to generate a raised bump with particular characteristics (e.g., a particular size and/or shape). The particular characteristics may be configured to simulate, e.g., a grain of sand and/or a sandy texture. The user may interact with the raised bump and perceive, e.g., the sandy texture.

In some embodiments, the processor 302 causes the actuation device to remove at least a portion of the substance from the haptic output device 318 to, e.g., change the shape of and/or otherwise deform the haptic output device 318. For example, the processor 302 may cause the actuation device to remove the substance from the haptic output device 318 in response to a user interaction with a virtual object comprising, e.g., a smooth or glassy texture. The processor 302 may cause an amount of the substance to be removed such that, e.g., the surface comprises a substantially planar shape. The planar shape may be configured to simulate, e.g., the smooth or glassy texture. The user may interact with the raised bump and perceive, e.g., the smooth or glassy texture.

The method 1100 continues at step 1104 when the processor 302 applies a stimulus to a substance associated with the haptic output device 318. For example, the processor 302 may cause the haptic output device 318 to apply heat to a smart material within a chamber of the haptic output device 318 in response to, e.g., an incoming phone call. In some embodiments, the substance expands, contracts, changes shape, changes physical state, and/or otherwise responds to the stimulus output by the haptic output device 318. This may cause the substance to apply pressure to, or otherwise interact with, a surface (e.g., a side wall and/or a flexible layer) of the haptic output device 318. For example, the smart material may expand in response to the heat. The expanding smart material may apply pressure to a flexible layer of the haptic output device 318. The interaction between the substance and the surface may cause the haptic output device 318 to deform in shape. For example, the expanding smart material may apply pressure to the flexible layer and cause the flexible layer to bulge outward. A user may interact with the haptic output device 318 and determine, e.g., that there is an incoming phone call. This may allow the user to detect the incoming phone call, e.g., if the phone is on silent.

In some embodiments, the substance comprises an electromagnet and/or an electrode. For example, the substance may comprise an electromagnet coupled to, e.g., the flexible layer of the haptic output device 318. In such an embodiment, the processor 302 may apply a stimulus comprising an electric signal to the substance. The substance may emit an electric field and/or a magnetic field in response to the stimulus. For example, the electromagnet may emit a magnetic field in response to receiving the electric signal. This may cause the substance to be attracted to, or repelled from, another nearby magnetic material. The attraction and/or repulsion may cause a pushing and/or pulling force on the surface of the haptic output device 318. This may cause the haptic output device 318 to deform in shape.

Advantages of Haptic Surface Elements

There are numerous advantages of haptic surface elements. For example, such systems may allow computing devices that are otherwise unable to output haptic feedback to output haptic feedback. For example, haptic cells may be easily coupleable to a computing device (e.g., to an outer casing and/or housing of a computing device) and configurable to generate haptic effects.

In some embodiments, haptic surface elements may be user configurable and capable of providing customizable haptic effects. For example, a user may be able to arrange any number of haptic cells on a surface of a computing device in any order or configuration. This may allow the user to customize the types and/or locations of the haptic effects the user receives.

In some embodiments, haptic surface elements may provide a more realistic or immersive user experience. For example, in some embodiments, a computing device may output a virtual object (e.g., a piece of crumpled paper) comprising a particular texture (e.g., a crumpled texture). The computing device may actuate one or more haptic cells (e.g., by raising or lowering a flexible surface of a haptic cell) to generate haptic effects configured to simulate the particular texture. A user may interact with the haptic cells and more realistically perceive the texture. As another example, in some embodiments, the computing device may actuate a plurality of haptic cells in sequence and/or in concert to generate a dynamic haptic effect. The dynamic haptic effect may more realistically simulate one or more of any number of physical phenomena, such as motion.

In some embodiments, haptic surface elements may provide information to a user. For example, a Braille device and/or other computing device (e.g., for the blind) may incorporate haptic cells. The computing device may actuate one or more of the haptic cells to generate, e.g., Braille writing. A user may be able to perceive the location and/or configuration of actuated haptic cells and determine, e.g., an associated letter. This may allow a user that is unable to see to, e.g., read books and articles, interact with websites, and/or perform other tasks.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may comprise computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A system comprising:
   an enclosure configured to define a boundary of a chamber, wherein a material is disposed in the chamber;
   a flexible layer coupled overtop of the chamber and configured to enclose the chamber;
   a first actuation device configured to receive a first haptic signal and, in response to the first haptic signal, output a first haptic effect by changing a characteristic of the material to deform the flexible layer;
   a second actuation device configured to receive a second haptic signal and, in response to the second haptic signal, output a second haptic effect by applying an electrical signal to the flexible layer; and
   a processor in communication with the first actuation device and the second actuation device, the processor configured to:
   transmit the first haptic signal to the first actuation device; and
   transmit the second haptic signal to the second actuation device.

2. The system of claim 1, further comprising a sensor positioned on the flexible layer or within the chamber, the sensor configured to detect a user interaction with the flexible layer and transmit a sensor signal associated with the user interaction, wherein the processor is further configured to:
   receive the sensor signal and determine the first haptic effect or the second haptic effect based at least in part on the sensor signal.

3. The system of claim 2, wherein the sensor comprises a smart material disposed within the flexible layer.

4. The system of claim 2, wherein the processor is further configured to:
   receive a first sensor signal from the sensor, the first sensor signal indicating a first force on the flexible layer;
   execute a first function based on the first force;
   receive a second sensor signal from the sensor, the second sensor signal indicating a second force on the flexible layer; and
   execute a second function based on the second force.

5. The system of claim 1, wherein the second haptic effect comprises an electrostatic haptic effect, an electrotactile haptic effect, a thermal haptic effect, or a deformation of the flexible layer.

6. The system of claim 1, wherein the processor is further configured to:
   determine a combined haptic effect based on an event, the combined haptic effect comprising the first haptic effect and the second haptic effect; and
   transmit the first haptic signal and the second haptic signal concurrently to output the combined haptic effect.

7. The system of claim 1, further comprising a display and a plurality of haptic cells, wherein the processor is further configured to:
   output a dynamic haptic effect associated with a virtual object moving across the display by sequentially actuating the plurality of haptic cells.

8. The system of claim 1, wherein the processor is in communication with a first sensor and a second sensor, the processor further configured to:
   receive a first sensor signal from the first sensor;
   receive a second sensor signal from the second sensor; and
   determine the first haptic effect or the second haptic effect based on the first sensor signal and the second sensor signal.

9. The system of claim 1, wherein the material comprises a smart material, an electroactive polymer, or a piezoelectric material, and wherein the first actuation device is configured to apply a stimulus to the material in response to the first haptic signal, the stimulus configured to cause the material to change in size.

10. The system of claim 1, wherein flexible layer and the chamber are positioned on a surface of a computing device, wherein the surface does not include a display.

11. A method comprising:
    determining a first haptic effect based on a first event, the first haptic effect comprising a deformation of a flexible layer enclosing a chamber;
    transmitting a first haptic signal to a first actuation device, the first actuation device configured to output the first haptic effect;
    outputting, via the first actuation device and in response to the first haptic signal, the first haptic effect by changing a characteristic of a material disposed within the chamber;
    determining a second haptic effect based on a second event;
    transmitting a second haptic signal to a second actuation device, the second actuation device configured to output the second haptic effect; and
    outputting, via the second actuation device and in response to the second haptic signal, the second haptic effect by transmitting an electrical signal to the flexible layer.

12. The method of claim 11, further comprising:
  receiving a sensor signal from a sensor positioned on the flexible layer or within the chamber, wherein the sensor is configured to detect an interaction with the flexible layer; and
  determining the first haptic effect or the second haptic effect based at least in part on the sensor signal.

13. The method of claim 11, further comprising:
  receiving a first sensor signal from a sensor configured to detect user interaction with the flexible layer, the first sensor signal indicating a first force on the flexible layer;
  executing a first function based on the first force;
  receiving a second sensor signal from the sensor, the second sensor signal indicating a second force on the flexible layer; and
  executing a second function based on the second force.

14. The method of claim 11, wherein the second haptic effect comprises an electrostatic haptic effect, an electrotactile haptic effect, a thermal haptic effect, or another deformation of the flexible layer.

15. The method of claim 11, further comprising:
  determining a combined haptic effect based on an event, the combined haptic effect comprising the first haptic effect and the second haptic effect; and
  transmitting the first haptic signal to the first actuation device and concurrently transmitting the second haptic signal to the second actuation device.

16. A non-transient computer readable medium comprising program code, which when executed by a processor is configured to cause the processor to:
  determine a first haptic effect based on a first event, the first haptic effect comprising a deformation of a flexible layer enclosing a chamber;
  transmit a first haptic signal to a first actuation device, the first actuation device configured to output the first haptic effect by changing a characteristic of a material disposed within the chamber;
  determine a second haptic effect based on a second event;
  transmit a second haptic signal to a second actuation device, the second actuation device configured to output the second haptic effect by transmitting an electrical signal to the flexible layer.

17. The non-transient computer readable medium of claim 16, further comprising program code, which when executed by the processor is configured to cause the processor to:
  receive a sensor signal from a sensor positioned on the flexible layer or within the chamber, wherein the sensor is configured to detect an interaction with the flexible layer; and
  determine the first haptic effect or the second haptic effect based at least in part on the sensor signal.

18. The non-transient computer readable medium of claim 16, further comprising program code, which when executed by the processor is configured to cause the processor to:
  receive a first sensor signal from a sensor configured to detect user interaction with the flexible layer, the first sensor signal indicating a first force on the flexible layer;
  execute a first function based on the first force;
  receive a second sensor signal from the sensor, the second sensor signal indicating a second force on the flexible layer; and
  execute a second function based on the second force.

19. The non-transient computer readable medium of claim 16, wherein the second haptic effect comprises an electrostatic haptic effect, an electrotactile haptic effect, a thermal haptic effect, or another deformation of the flexible layer.

20. The non-transient computer readable medium of claim 16, further comprising program code, which when executed by the processor is configured to cause the processor to:
  determine a combined haptic effect based on an event, the combined haptic effect comprising the first haptic effect and the second haptic effect; and
  transmit the first haptic signal to the first actuation device and concurrently transmit the second haptic signal to the second actuation device.

* * * * *